(12) United States Patent
McNabb

(10) Patent No.: US 11,803,993 B2
(45) Date of Patent: Oct. 31, 2023

(54) MULTIPLANE ANIMATION SYSTEM

(71) Applicant: Disney Enterprises, Inc., Burbank, CA (US)

(72) Inventor: Michael McNabb, San Francisco, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/444,146

(22) Filed: Feb. 27, 2017

(65) Prior Publication Data
US 2018/0246871 A1    Aug. 30, 2018

(51) Int. Cl.
*G06F 40/186* (2020.01)
*G06T 13/20* (2011.01)
*G06F 40/143* (2020.01)

(52) U.S. Cl.
CPC ........... *G06T 13/20* (2013.01); *G06F 40/143* (2020.01); *G06F 40/186* (2020.01)

(58) Field of Classification Search
CPC .. G06F 17/248; G06F 17/2247; G06F 40/186; G06F 40/14; G06T 13/20
USPC ........................................ 715/255, 273, 229
See application file for complete search history.

(56) References Cited

U.S. PATENT DOCUMENTS

| | | | | |
|---|---|---|---|---|
| 6,732,331 B1* | 5/2004 | Alexander | ............ | G06F 17/218 707/999.01 |
| 8,161,369 B2* | 4/2012 | Bhatt | .................. | G06F 16/4393 715/202 |
| 8,667,394 B1* | 3/2014 | Spencer | .............. | G06F 17/2241 707/769 |
| 8,892,995 B2* | 11/2014 | Hoppenot | ............... | G06F 17/00 715/255 |
| 8,938,669 B1* | 1/2015 | Cohen | ..................... | G06F 17/24 709/204 |
| 9,374,558 B2* | 6/2016 | Bannister | ............... | H04N 7/165 |
| 9,454,515 B1* | 9/2016 | Jain | ..................... | G06F 17/2247 |
| 9,871,879 B2* | 1/2018 | Kitchen | ............. | H04L 67/2828 |
| 2002/0059327 A1* | 5/2002 | Starkey | ................. | G06F 16/972 |
| 2003/0182458 A1* | 9/2003 | Ali | ........................... | G06F 8/38 719/310 |
| 2003/0221184 A1* | 11/2003 | Gunjal | ...................... | G06F 8/24 717/118 |
| 2004/0064836 A1* | 4/2004 | Ludvig | ............. | H04N 7/17336 725/95 |

(Continued)

OTHER PUBLICATIONS

DeLine et al., Code Canvas: Zooming towards Better Development Envirionments, ACM 2010, pp. 207-210.*

(Continued)

*Primary Examiner* — Sanchita Roy
(74) *Attorney, Agent, or Firm* — Artegis Law Group, LLP

(57) ABSTRACT

One embodiment of the present invention sets forth a technique for generating a content page having a plurality of layers. The technique includes detecting a first application event associated with a first layer included in a plurality of layers of a content page and accessing, via a template file, at least one parameter of the first layer that corresponds to the first application event. The technique further includes modifying at least one aspect of the first layer based on the first application event and the at least one parameter to generate a first modified layer, and outputting the first modified layer for display.

22 Claims, 12 Drawing Sheets

(56) References Cited

U.S. PATENT DOCUMENTS

| | | | | |
|---|---|---|---|---|
| 2005/0210380 | A1* | 9/2005 | Kramer | G06T 11/00 715/244 |
| 2006/0195465 | A1* | 8/2006 | Atchison | G06F 17/30011 |
| 2008/0059889 | A1* | 3/2008 | Parker | G06F 17/30241 715/748 |
| 2009/0198823 | A1* | 8/2009 | Bannister | H04N 7/165 709/230 |
| 2010/0115430 | A1* | 5/2010 | Skirpa | G06F 3/0481 715/760 |
| 2011/0113325 | A1* | 5/2011 | Richardson | G06F 17/2288 715/255 |
| 2011/0161792 | A1* | 6/2011 | Florence | G06F 16/9558 715/205 |
| 2011/0167105 | A1* | 7/2011 | Ramakrishnan | G06Q 10/10 709/203 |
| 2012/0082385 | A1* | 4/2012 | Xu | G06K 9/6857 382/199 |
| 2012/0239732 | A1* | 9/2012 | Liang | G06F 17/30899 709/203 |
| 2013/0007587 | A1* | 1/2013 | Marantz | G06F 17/30896 715/234 |
| 2013/0185632 | A1* | 7/2013 | Damera-Venkata | G06F 17/248 715/243 |
| 2013/0212487 | A1* | 8/2013 | Cote | G06F 9/451 715/745 |
| 2013/0318465 | A1* | 11/2013 | Cheng | G06F 3/0483 715/776 |
| 2014/0019865 | A1* | 1/2014 | Shah | G06F 3/0484 715/731 |
| 2014/0033026 | A1* | 1/2014 | Sheridan | G06F 3/048 715/249 |
| 2014/0250058 | A1* | 9/2014 | Thiruvidan | G06F 17/30011 707/608 |
| 2014/0372415 | A1* | 12/2014 | Fernandez-Ruiz | G06F 16/9038 707/722 |
| 2015/0205884 | A1* | 7/2015 | Leventhal | G06F 40/131 715/234 |
| 2015/0324375 | A1* | 11/2015 | Lineberger | G06F 17/241 726/26 |
| 2016/0077824 | A1* | 3/2016 | Vishnepolsky | G06F 16/958 717/172 |
| 2016/0232151 | A1* | 8/2016 | Blackmon | G06F 40/14 |
| 2016/0284112 | A1* | 9/2016 | Greenberg | G06F 40/117 |
| 2017/0024359 | A1* | 1/2017 | Gagliano | G06F 17/211 |
| 2018/0046602 | A1* | 2/2018 | Sisson | G06F 17/24 |
| 2018/0196800 | A1* | 7/2018 | Volkovs | G06F 17/2785 |

OTHER PUBLICATIONS

Fox et al., Spatio-Temporal Indexing in Non-relational Distributed Databases, IEEE 2013, pp. 291-299.*

Hua et al., Interactive Video Authoring and Sharing Based on Two-Layer Templates, ACM 2006, pp. 65-74. (Year: 2006).*

Norrie et al., Content Publishing Framework for Interactive Paper Documents, ACM 2005, pp. 187-196. (Year: 2005).*

Singh et al., Event-Based Modeling and Processing of Digital Media, ACM 2004, pp. 19-26. (Year: 2004).*

Signer et al., Introducing Templates and Variables Content Elements for Interactive Paper Publishing, Springer 2012, pp. 1309-1332. (Year: 2012).*

* cited by examiner

FIG. 6

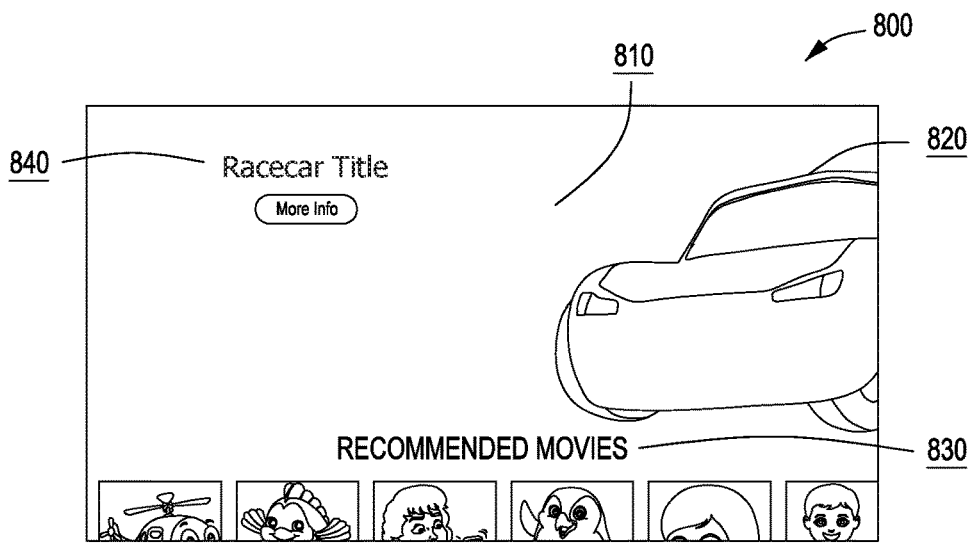
FIG. 8A
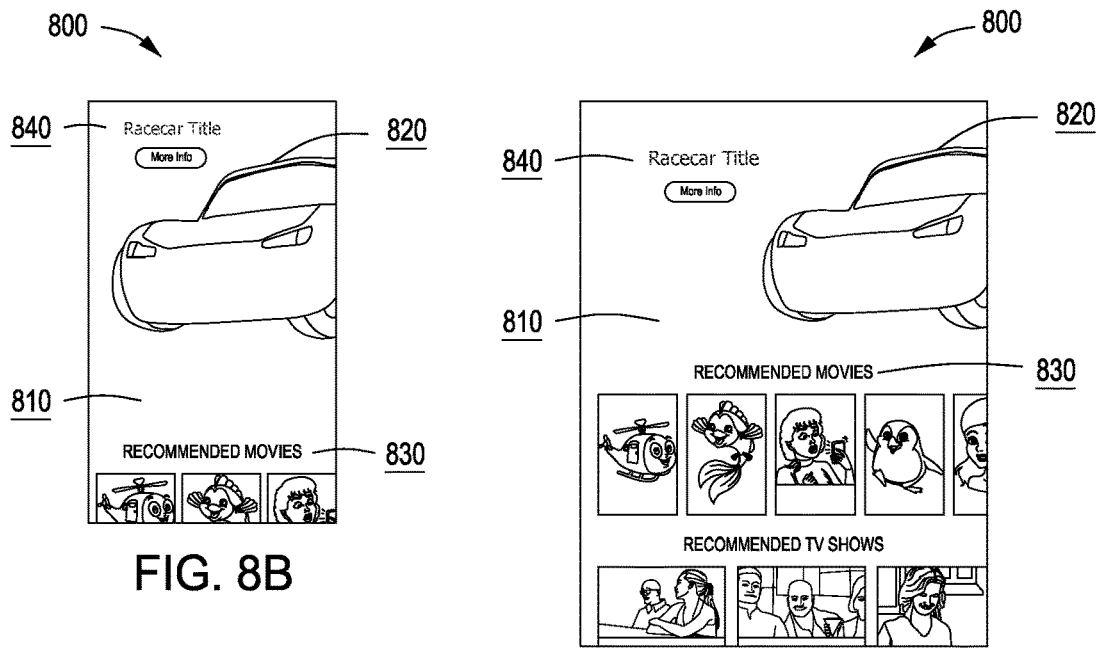
FIG. 8B
FIG. 8D
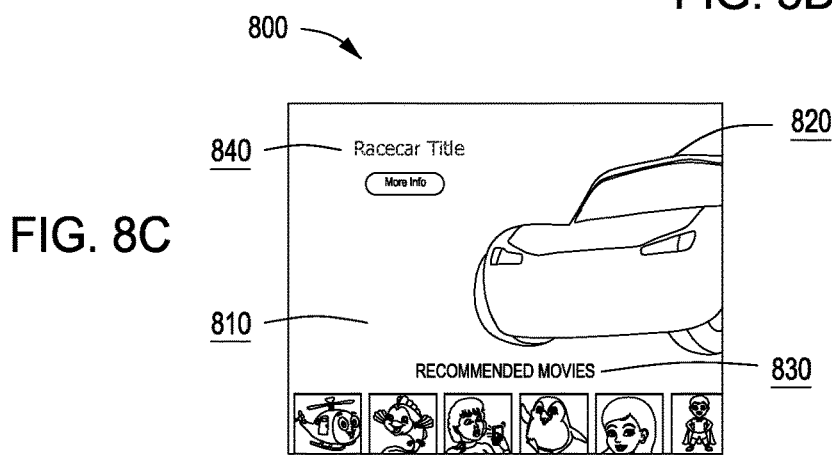
FIG. 8C

MULTIPLANE ANIMATION SYSTEM

BACKGROUND OF THE INVENTION

Field of the Invention

Embodiments of the present invention relate generally to computer graphics and, more particularly, to a multiplane animation system.

Description of the Related Art

The design of an application plays a vital role in attracting new users, conveying to the users the core thematic elements of the application, and keeping the user fully engaged as they use the application. An effectively designed application welcomes the user, conveys the desired theme, and/or facilitates the user in quickly locating content that relates to the user's interests. Providing an engaging environment is critical to attracting a new user and keeping the user interested in the application content.

In order to provide a more engaging user experience, many applications, including web browsers, smartphone applications, etc., integrate video content in conjunction with other types of content being displayed on a webpage or application menu. The video content is typically chosen to complement and enhance the other types of content being displayed.

One major disadvantage of displaying videos in applications is that they typically require a large amount of device memory and/or network bandwidth. Consequently, small, low-power devices often do not have sufficient memory and/or processing resources to effectively display such video content which may detract from the overall user experience. In addition, videos are time-intensive to create and cannot be easily updated without requiring the user to re-download the entire video.

As the foregoing illustrates, what is needed in the art is a more effective approach for generating and displaying application content.

SUMMARY OF THE INVENTION

One embodiment of the present invention sets forth a method for generating a content page having a plurality of layers. The method includes detecting a first application event associated with a first layer included in a plurality of layers of a content page and accessing, via a template file, at least one parameter of the first layer that corresponds to the first application event. The method further includes modifying at least one aspect of the first layer based on the first application event and the at least one parameter to generate a first modified layer, and outputting the first modified layer for display Further embodiments provide, among other things, a non-transitory computer-readable medium and a computing device configured to implement the method set forth above.

At least one advantage of the disclosed techniques is that memory, bandwidth, and processing requirements are significantly reduced. In addition, templates that specify how various types of layers are positioned and/or animated can be stored separately from the corresponding assets, enabling updated templates to be quickly downloaded at runtime. Furthermore, specific effects and/or layers can be modified or disabled on certain types of devices (e.g., devices having lower memory capacity, lower processing power, and/or smaller screen sizes), without significantly detracting from the overall user experience.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6 illustrates an interface for configuring a template by selecting how application events affect parameters associated with assets and layers included in the template, according to various embodiments of the present invention;

FIGS. 8A-8D illustrate content pages that may be implemented by different device classes based on a class parameter specified in a template, according to various embodiments of the present invention.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

Figure 1:
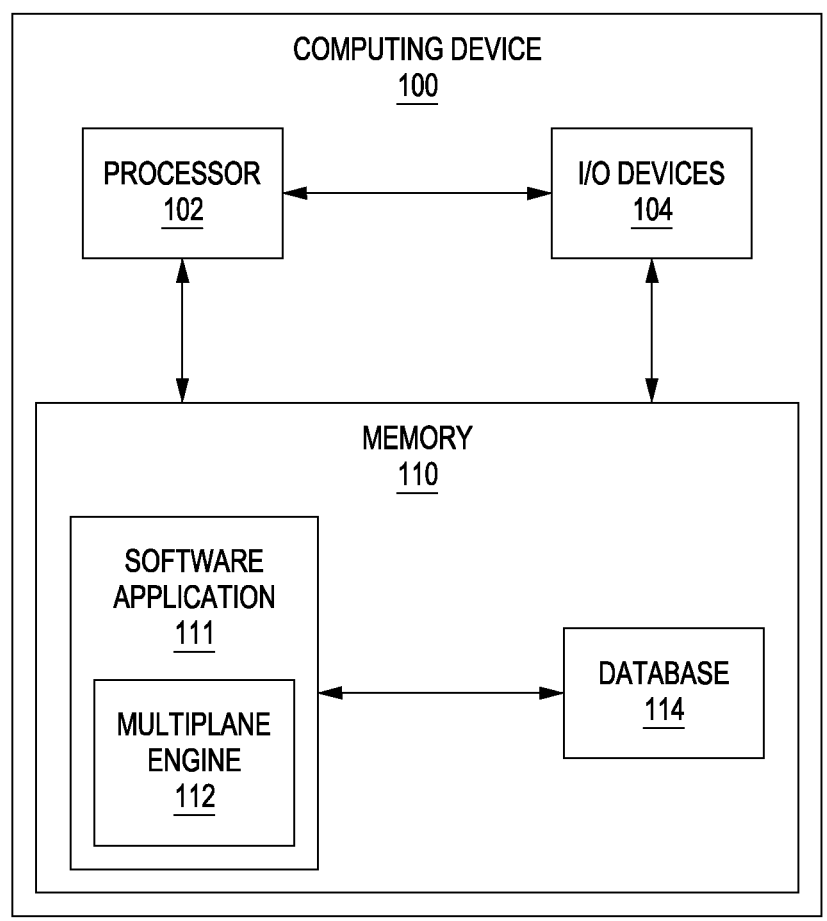
FIG. 1 illustrates a conceptual block diagram of a computing device configured to implement one or more aspects of the present invention.

FIG. 1 illustrates a conceptual block diagram of a computing device 100 configured to implement one or more aspects of the present invention. As shown, the computing device 100 includes a processor 102, input/output (I/O) devices 104, and a memory 110. The memory 110 includes a software application 111 configured to interact with a database 114. The software application 111 includes a multiplane engine 112.

The processor 102 may be any technically feasible form of processing device configured to process data and execute program code. The processor 102 could be, for example, and without limitation, a central processing unit (CPU), an application-specific integrated circuit (ASIC), a digital signal processor (DSP), a field-programmable gate array (FPGA), and so forth.

Memory 110 may include a memory module or a collection of memory modules. The software application 111 and the multiplane engine 112 within memory 110 are executed by the processor 102 to implement the overall functionality of the computing device 100. For example, and without limitation, the software application 111 may include any type of application with which a user can view content, such as video, audio, text, and/or other types of application content. The multiplane engine 112 may detect application events and access a template (e.g. a configuration file, a JavaScript Object Notation (JSON) file, an eXtensible Markup Language (XML) file, etc.) in order to determine whether a parameter associated with a layer (e.g. an audio layer, a color layer, a gradient layer, etc.) should be adjusted based on the application event. The multiplane engine 112 may then modify the layer and output the modified layer for display. The processing performed by the multiplane engine 112 may include, for example, and without limitation, detecting application events, parsing data in a template, associating application events with layers, associating application events with parameters, adjusting parameters based on application events, modifying aspects of layers, and/or outputting layers for display.

The software application 112 may also access one or more computer networks via the I/O devices 104, for example, in order to send and/or receive information to/from a website, a remote database, etc. Database 114 within memory 110 may store application events, templates, layers, parameters, regions, and/or other data.

I/O devices 104 may include input devices, output devices, and devices capable of both receiving input and providing output. For example, and without limitation, I/O devices 104 could include one or more sensors that detect changes to the orientation, acceleration, location, etc. of the device, such as changes produced by user input. Examples of such devices may include, without limitation, global navigation satellite system (GNSS) devices, magnetometers, inertial sensors, gyroscopes, accelerometers, visible light sensors, ultrasonic sensors, infrared sensors, radar sensors, and/or depth sensors. In addition, input devices could include other types of human interface devices, other types of sensors, and wired and/or wireless communication devices that send data to and/or receive data from the computing device 100.

Figure 2:
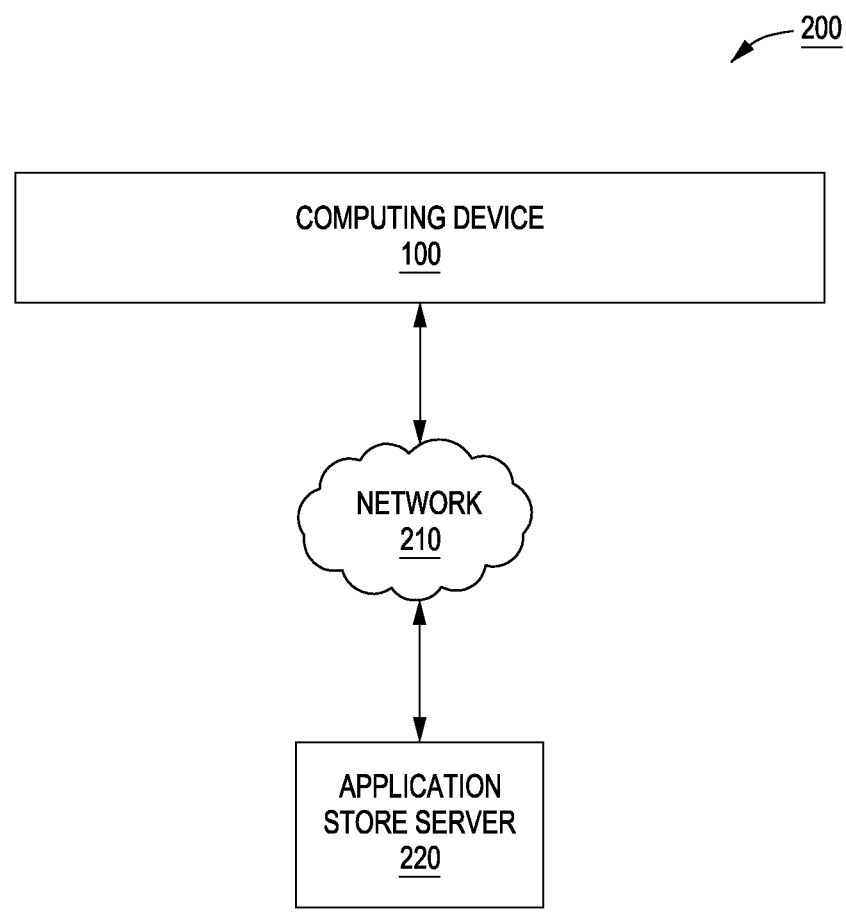
FIG. 2 illustrates a conceptual block diagram of a network through which the computing device of FIG. 1 communicates with one or more servers, according to various embodiments of the present invention.

FIG. 2 illustrates a conceptual block diagram of a network through which the computing device of FIG. 1 communicates with one or more servers, according to various embodiments of the present invention. As shown, the computing device 100 transmits and/or receives information, such as application data, user credentials, etc., to and/or from the application server 220 via the network 210. In some embodiments, the software application 111, and/or the multiplane engine 112 provides an interface that enables a user to log into the application server 220. The user can then access information on the application server 220, such as software application updates, user account information, and/or other types of data related to the software application 111.

The application server 220 may store one or more versions of the software application 111, user account information, and/or troubleshooting information. The application server 220 can provide updated versions of the software application 111 to the computing device 100 via the network 210 as well as updating various aspects of the software application 111, such as downloading additional templates, assets, etc. from the application server 220.

As noted above, conventional techniques for generating and displaying application content suffer from a number of drawbacks. In particular, displaying video content in an application typically requires a large amount of device memory, processing power, and/or network bandwidth. Consequently, small, low-power devices often do not have sufficient memory, processing resources, and/or bandwidth to effectively display such video content which may detract from the overall user experience. In addition, video content is time-intensive to create and cannot be easily updated without requiring the user to re-download large video files.

Various embodiments described herein overcome these and other deficiencies of conventional approaches for generating and/or displaying application content by implementing a multilayer interface, where the behavior of individual layers can be specified via one or more templates. In particular, a template can specify how asset(s) associated with one or more layers respond to various types of application events, such as user input events and/or time events. In various embodiments, upon detecting an application event, the multiplane engine 112 reads one or more parameters from the template to determine how an aspect of the corresponding layer is to be modified. The modified layer is then outputted for display. The multiplane engine 112 may further adjust the manner in which certain layers are displayed and/or modified based on the characteristics of the user device. For example, the multiplane engine 112 could adjust how content is displayed based upon various aspects of the user's device, including screen size, memory capacity, and/or processing power. Examples of such techniques are described below in further detail in conjunction with FIGS. 3, 4A-4D, 5A-5F, 6, 7A-7B, 8A-8D, and 9.

Figure 3:
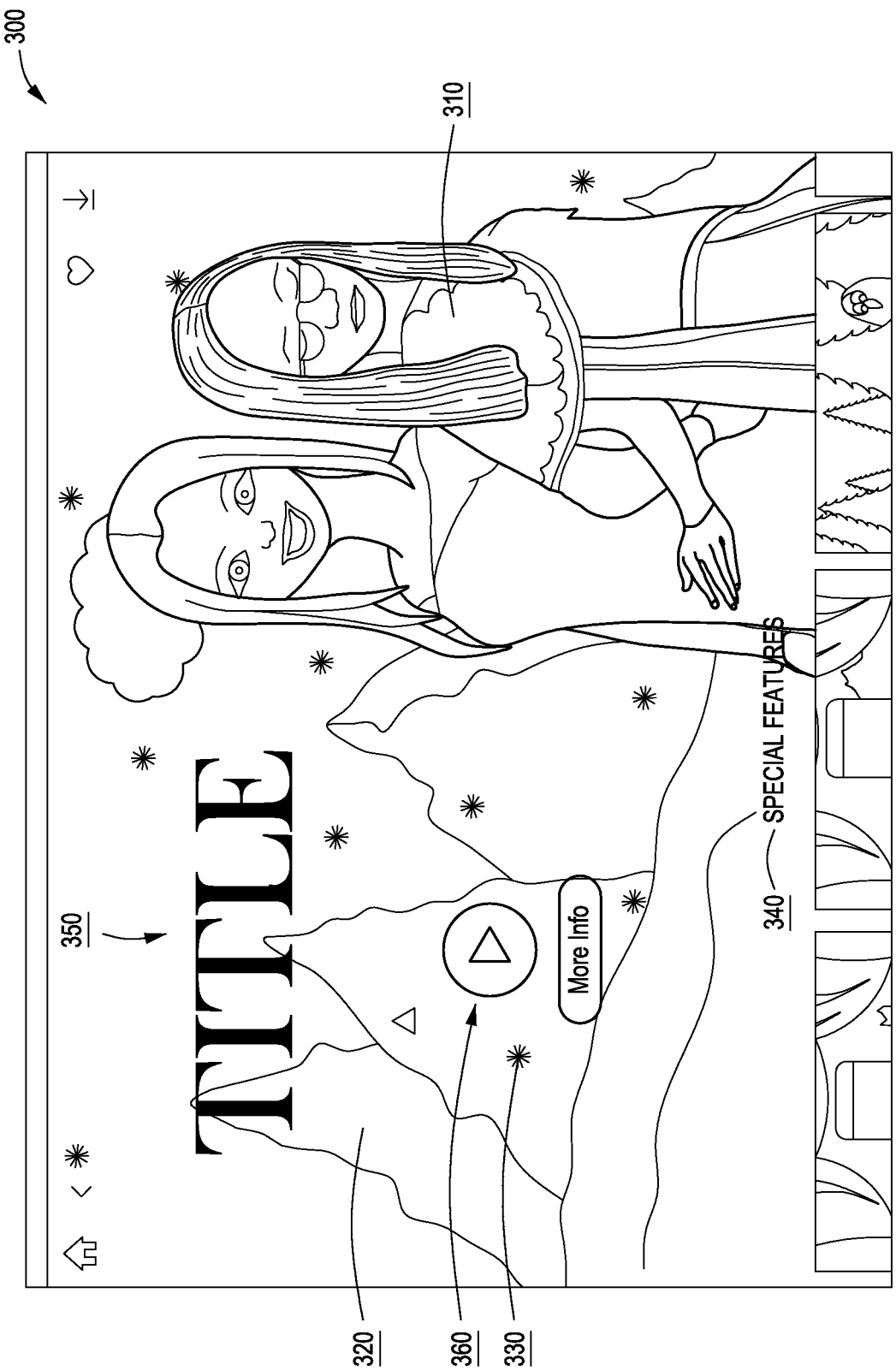
FIG. 3 illustrates a content page that includes content generated by the multiplane engine, according to various embodiments of the present invention.

FIG. 3 illustrates a content page 300 that includes content generated by the multiplane engine 112, according to various embodiments of the present invention. As shown, content page 300 includes a character image layer 310, a background image layer 320, a particle layer 330, and an application content layer 340.

The character image layer 310 includes two characters within a header region of the content page 300. The background image layer 320 includes an image of mountains within the header region of the content page 300. The particle layer 330 includes snow flake particles distributed throughout the header region of the content page 300. In some embodiments, the application content layer 340 is a placeholder for application content, which may include clickable banners, thumbnail images that represent other content pages related to the content page 300, and/or other types of content generated by the software application 111.

As discussed above, content page 300 includes multiple layers, stacked one on top of another. In various embodiments, the layers may include a color layer, a gradient layer, an image layer, a media layer, a particle layer, an application content layer, a third-party script layer, and/or other types of layers. Each layer may be associated with one or more parameters that specify how the layer is displayed and/or how the layer is modified in response to application events. Layers may also be associated with one or more assets, such as graphics, images, and media files. In addition, layers may be displayed in different regions of the content page 300. For example, a particular layer could be displayed in the header, in the footer, or throughout the entire content page 300.

In various embodiments, the multiplane engine 112 reads a template which includes parameters that specify how the multiplane engine 112 should display one or more layers included in a particular content page. For example, the template could include one or more URLs that point to specific images and/or media files that are to be displayed or played within the content page. In addition, templates may specify where assets are to be positioned within a content page. The template could further include instructions indicating how one or more parameters of each layer should be modified in response to application events, such as user input.

Each type of layer may further be associated with one or more parameters that include a position parameter, a size parameter, a z order parameter, an opacity parameter, and a class parameter. In some embodiments, the position of a layer may determine the region of the content page 300 in which assets included in the layer are to be displayed. The size of a particular layer may indicate the dimensions and/or scaling of assets included in the layer when the assets are displayed on the content page 300.

In some embodiments, the z order indicates the order of a particular layer in a stack of layers. For example, the z order could be expressed as any real number. In some embodiments, a higher z order is assigned to layers that appear closer to the user, while a lower z order is assigned to layers that appear further from the user. However, any ordering scheme for stacking layers is within the scope of the embodiments described herein. For example, as shown in content page 300, the application content layer 340 has a higher z order than the character image layer 310, because the application content layer 340 appears in front of the character image layer 310. However, the background image layer 320 has a lower z order than the character image layer 310, because the background image layer 320 appears to be behind the character image layer 310.

The opacity of a particular layer indicates a transparency with which assets included in the layer are to be displayed. Together, the opacity, z order, and/or other types of parameters (e.g., a blur parameter) associated with one or more layers may be implemented to generate various types of multi-layer effects in content page 300, as described below in further detail in conjunction with FIGS. 4A-4D.

In various embodiments, different computing devices, such as computing device 100, may be assigned to different classes of devices, depending on one or more characteristics of the devices (e.g., display size, display resolution, processing capabilities, etc.). For example, different classes of devices may include a smartphone class, a tablet computer class, a laptop computer class, a desktop computer class, and a set-top box class. In operation, each layer included in a template may be associated with one or more classes of devices. Then, when the multiplane engine 112 is executed on a particular device, the multiplane engine 112 may determine, based on the template and the class to which the device is assigned, whether to and/or how to display each layer on a display associated with that device.

In some embodiments, different versions of a particular layer may be included in the template for different classes of devices. For example, the multiplane engine 112 could be executing on a first computing device that is associated with a first class of devices and also executing on a second computing device that is associated with a second class of devices. The template could then include both a first version of a layer and a second version of the layer included in content page 300, where the first version of the layer and is associated with the first class of devices, and the second version of the layer is distinct from the first version and is associated with the second class of devices. Then, when the multiplane engine 112 displays the content page 300 by reading the corresponding template, the multiplane engine 112 would display the first version of the layer on the first computing device, and would display the second version of the layer on the second computing device. Techniques that implement different types of layers for different classes of devices are described below in further detail in conjunction with FIGS. 5A-5F and FIGS. 8A-8D.

In some embodiments, a color layer may be associated with a parameter that defines a default color (e.g., a background color) of a content page 300. A gradient layer may be associated with parameters that define a gradient between two or more colors. Parameters associated with a particular gradient layer may include a first color, one or more additional colors, and parameters which define other aspects of the gradient, such as the locations, shapes, and/or sizes of transitions between two or more colors. For example, a parameter may define an angle of a linear gradient, a parameter may define the location of the center of a radial gradient, and/or a parameter may define the width of a transition between two colors included in a gradient.

An image layer may include one or more images, such as one or more computer graphics. For example, as shown in FIG. 3, a character image layer of content page 300 may include one or more character images and a background image layer may include one or more background images. In some embodiments, an image layer may be associated with parameters that include uniform resource locator(s) (URLs) of image(s) to be displayed in the image layer, an amount and/or type of blur to be applied to an image included in the image layer, and/or other parameters such as size, position, opacity etc. that control how images are displayed. In addition, the image layer may include a brightness parameter that controls how bright an image appears on the content page 300.

A particle layer may include multiple particles (e.g., sprite images) that are located and/or move within a particular region of the content page 300. For example, the particle layer 330 of content page 300 includes snow particles that move within a region of content page 300. In some embodiments, a particle layer may be associated with parameters that define various aspects of the particles included therein. For example, a particle layer may be associated with parameters that define one or more particle types (e.g., a URL to a particle bitmap image, vector graphic, etc.), a particle birth rate, a particle lifetime, a particle direction, a particle velocity, a particle acceleration, and/or a particle spin.

A media layer may include audio content and/or video content, such as a music track, a movie, a TV show, and/or special effects for a content page. In general, a media layer may be associated with parameters that may include an audio file URL, a video file URL, a volume, a fade-in time, a fade-out time, and/or other parameters. In some embodiments, the media layer could include a video with an alpha channel parameter that controls the transparency with which the video is displayed. In addition, the media layer could include text and corresponding text parameters, such as a font parameter, a font size parameter, a text alignment parameter, etc.

The software application 111 may generate application content, such as images, text, videos, e-books, etc., that is distinct from the content page(s) generated by the multiplane engine 112. However, in some embodiments, the application content generated by the software application 111 may be displayed in conjunction with content page(s), layer(s), and/or asset(s) that are generated by the multiplane engine 112. Accordingly, in order to avoid conflicts between the application content and the content page(s), layer(s), and/or asset(s) that are generated by the multiplane engine 112, the template associated with a particular content page may include an application content layer. As noted above, the application content layer may serve as a placeholder for application content that is generated by the software application 111.

In some embodiments, the application content layer may be associated with an alignment parameter and an aspect ratio. For example, the alignment parameter could provide the software application 111 with a hint as to where application content should be displayed on the content page 300. Further, the aspect ratio parameter could provide the software application 111 with a hint regarding how much empty space should be present below the content generated by the software application 111. When generating a particular content page for display, the multiplane engine 112 could transmit these parameters to the software application 111 to assist the software application 111 to optimally size and position displayed application content on the content page 300.

For example, as shown in FIG. 3, the software application 111 could determine the size and position of the application content layer 340, in addition to determining which clickable banners and/or thumbnail images to display in the content page 300. The software application 111 could also determine the manner in which the content page title 350 is displayed, including determining the position and size of the application content. The multiplane engine 112 could provide the software application 111 with the alignment and aspect ratio parameters to assist the software application 111 in positioning the application content in the content page 300.

Alternatively or additionally, one or more of the parameter(s) associated with the application content layer could be read by the multiplane engine 112, and the multiplane engine 112 could reposition, resize, and/or modify the opacity of application content outputted by the software application 111. As a result, conflicts (e.g., overlaps, collisions, etc.) between the application content generated by the software application 111 and content page(s), layer(s), and/or asset(s) that are generated by the multiplane engine 112 can be more effectively avoided.

A third-party script layer may include an animation script generated by a third-party software application (e.g., Adobe® After Effects®). In some embodiments, a third-party script layer could include a script that causes an animation, such as an animated icon, to be rendered and displayed within a content page. For example, an animated icon that responds to user input (e.g., mouse hover, touchscreen press, etc.) could be generated via a third-party software application and then displayed by the multiplane engine 112 within a third-party script layer of a content page.

As discussed above, in order for the multiplane engine 112 to display an asset, the asset may be downloaded from the application server 220. For example, when the user accesses the content page 300, the multiplane engine 112 could receive and read a template that includes a URL pointing to the asset, such as a character image or particle bitmap, stored on the application server 220. The multiplane engine 112 would then download the asset and display the asset in a corresponding layer specified by the template. The process by which the multiplane engine 112 may receive and read from the template, download assets, and display a corresponding content page is described below in greater detail in conjunction with FIG. 9.

FIGS. 4A-4D illustrate an animation of various assets and layers generated by the multiplane engine 112 in response to a user titling the computing device 410, according to various embodiments of the present invention. As described above, the multiplane engine 112 displays a content page 410 as layers, stacked one on top of another. Each layer may be associated with one or more parameters that define various properties of the layer, such as size, position, opacity, etc.

The content page 410 shown in FIGS. 4A-4D includes multiple image layers, including a foreground tree image layer 418, a mid-ground tree image layer 420, a forest image layer 412, a light image layer 414, and a log image layer 422. The content page 410 may further include one or more application content layers 426, 428, 430, 432, and 436 that specify one or more properties (e.g., position, size, opacity) of an album title 432, a media interface 430, a current track title 426, and an upcoming track title 428. In alternative embodiments, there could be a single application content layer which includes the album title, the media interface, and the current and upcoming track titles, as well as any other application content. In addition, the content page 410 may include a media layer that specifies how and/or when an audio track is played. Each layer displayed by the multiplane engine 112 is associated with one or more parameters that define various properties of the layer.

The forest image layer 412 may include a size parameter that specifies that the image of the forest should be sized to cover the entire width and height of the content page 410 and/or a position parameter that specifies that the image of the forest should be displayed in the center of the content page 410. The forest image layer 412 may further include an opacity parameter that specifies that the image of the forest should be opaque, and a z order parameter that specifies that the image of the forest should be displayed at the back of the stack of layers, behind the forest image layer 412. Additionally, the forest image layer 412 could include a blur parameter that specifies that the image of the forest should be blurred slightly, giving the user the illusion that the image of the forest is far away.

The light image layer 414 may include a size parameter that specifies the height and/or width of the image of the light and/or a position parameter that specifies that the image of the light should be displayed in a specific location (e.g., near the ground and in the center of the content page 410). An opacity parameter may specify that the light image layer 414 appears partially transparent, in order to more realistically emulate a lighting effect. A z order parameter may specify that the light image layer 414 appears in front of the forest image layer 412 but behind the mid-ground tree image layer 420. The light image layer 414 could include a class parameter that indicates that the light image layer 414 should be displayed on all classes of devices. Finally, the light image layer 414 could include a blur parameter that adds a slight blur to the image of the light, further enhancing the realistic lighting effect.

The scattered light image layer 416 may include a size parameter that specifies the height and/or width of the image of the scattered light and/or a position parameter that specifies that the image of the scattered light should be displayed near the ground and in the center of the content page 410. An opacity parameter may specify that the scattered light image layer 416 appears partially transparent, in order to more realistically emulate a lighting effect. A z order parameter may specify that the scattered light image layer 416 appears in front of the forest image layer 412, but behind the light image layer 414. The scattered light image layer 416 could further include a class parameter that indicates that the scattered light image layer 416 should be displayed on all classes of devices. Finally, the scattered light image layer

416 could include a blur parameter that adds a slight blur to the image of the scattered light, further enhancing the realistic lighting effect.

The foreground tree image layer 418 may include a size parameter that specifies the height and/or width of the image of the foreground tree and/or a position parameter that specifies that the image of the foreground tree should be displayed on the left side of the content page 410. The foreground image layer 418 may further include an opacity parameter that specifies that the image of the foreground tree should be opaque, and a z order parameter that specifies that the image of the foreground tree should be displayed near the front of the stack of layers, in front of the forest image layer 412. Additionally, the foreground image layer 418 could include a blur parameter that specifies that no blur should be applied to the image of the foreground tree, so that the foreground tree appears to be closer to the user.

The mid-ground tree image layer 420 may include a size parameter that specifies the height and/or width of the image of the mid-ground tree and/or a position parameter that specifies that the image of the mid-ground tree should be displayed on the left side of the content page 410. The mid-ground tree image layer 420 may further include an opacity parameter that specifies that the image of the mid-ground tree should be opaque, and a z order parameter that specifies that the image of the mid-ground tree should be displayed near the front of the stack of layers, in front of the forest image layer 412, but behind the foreground tree image layer 418. Additionally, the mid-ground tree image layer 420 could include a blur parameter that specifies that the image of the mid-ground tree should be blurred slightly, giving the user the illusion that the image of the mid-ground tree is further away than the foreground tree.

The log image layer 422 may include a size parameter that specifies the height and/or width of the image of the log and/or a position parameter that specifies that the image of the log should be displayed on the right side of the content page 410. The log image layer 420 may further include an opacity parameter that specifies that the image of the log should be opaque, and a z order parameter that specifies that the image of the log should be displayed near the front of the stack of layers, in front of the forest image layer 412. Additionally, the log image layer 420 could include a blur parameter that specifies that the image of the log tree should not be blurred, giving the user the illusion that the image of the log is nearby.

By contrast, the media layer may be associated with parameters that include a media URL parameter, a volume parameter, a fade-in time parameter, and a fade-out time parameter. The media URL parameter may specify the URL of the media file to be played. In some embodiments, the multiplane engine 112 may use the media URL parameter to stream the media content played by the software application 111 via the network 210 from the application server 220. Further, the multiplane engine 112 could download a media file associated with the media URL parameter and store the file in the database 114. In some embodiments, the volume parameter may specify the volume of the audio.

Each of the application content layers 426, 428, 430, 432 could include an alignment parameter and an aspect ratio parameter that may prove the software application 111 with hints about the optimal position and size of the application content in the content page 410. Further, the application content layers 426, 428, 430, and 432 could include an opacity parameter which specifies that each application content layer should be transparent. Further, the application content layers 426, 428, 430, and 432 could include a z order parameter which specifies the order in which the layer should be displayed with reference to other visible layers. For example, the application content layers 426, 428, 430, and 432 should be displayed at the front of the stack of layers, in front of the forest image layer 412. In addition, the application content layers 426, 428, 430, and 432 may also include a class parameter which specifies that the application content layers 426, 438, 430, and 432 should be displayed on all classes of devices. In some embodiments, the application content layers 426, 428, 430, and 432 could be replaced with a single application content layer which provides the software application 111 with hints in order to assist the software application in optimally displaying the album title, the media interface, and the current and upcoming track titles.

As noted above, a template may include instructions indicating how one or more parameters associated with one or more layers should be modified in response to one or more types of application events. Various application events may be implemented to modify layer(s). In general, an application event may include any change of state associated with the software application 111 and/or the computing device 100. In some embodiments, application events could include a user input event, a time event, and/or an external event, such as data received from another device or software application. Upon detecting an application event, the multiplane engine 112 may modify one or more aspects of one or more layers based on the parameter stored in a template associated with the content page.

Figure 4A:
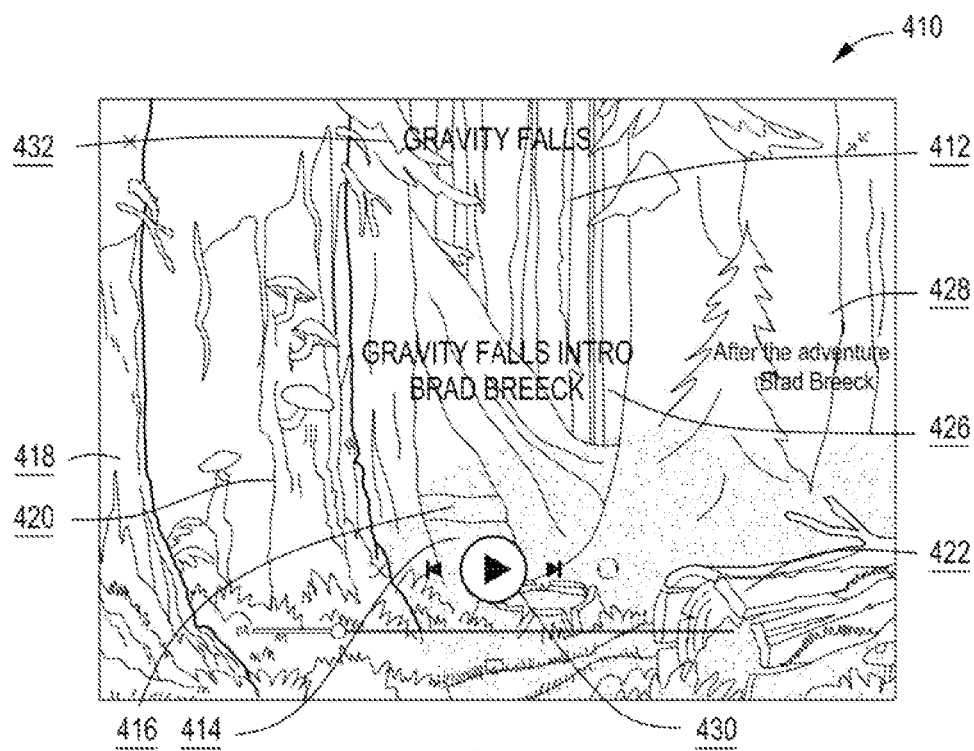
FIGS. 4A-4D illustrate an animation of various assets and layers generated by the multiplane engine in response to a user titling the computing device, according to various embodiments of the present invention.
Figure 4B:
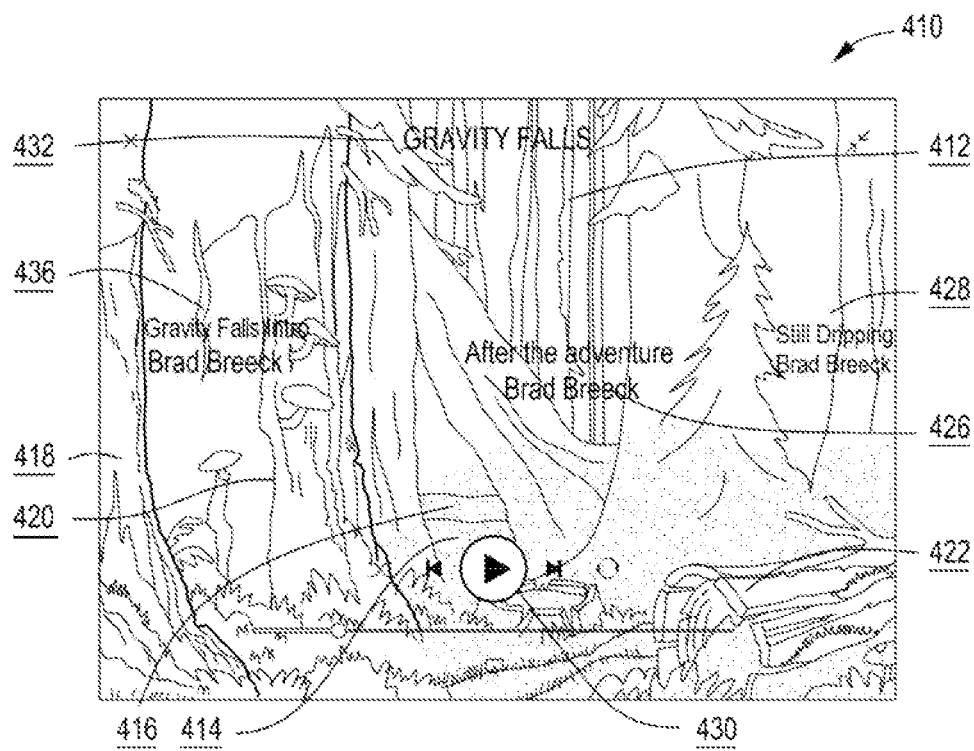
Figures 4C, 4D:
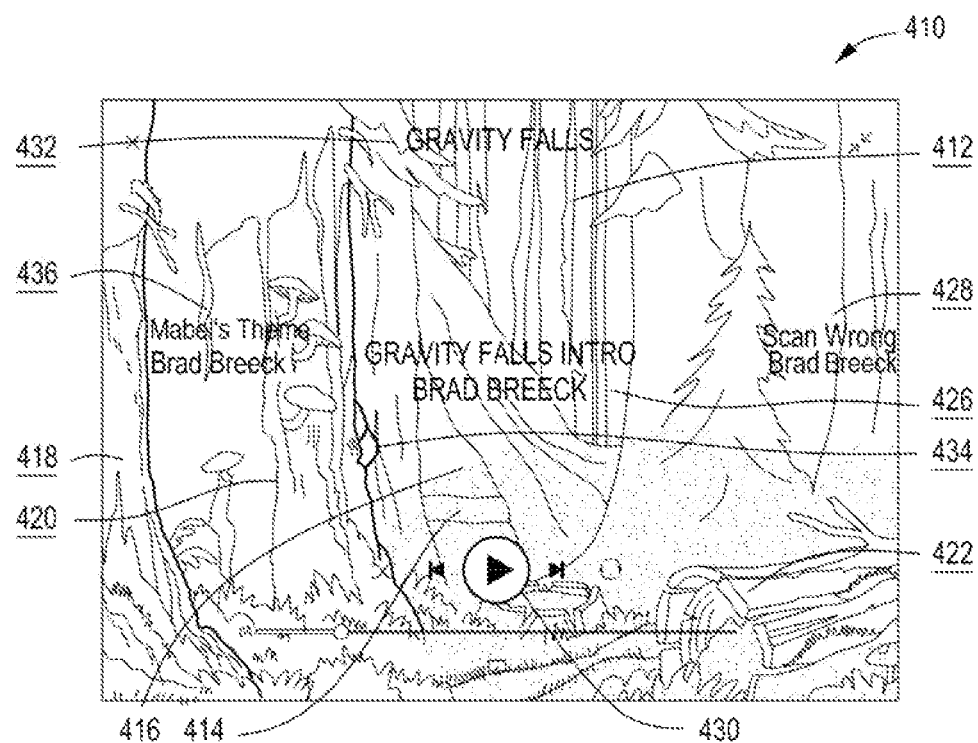

In some embodiments, as shown in FIGS. 4B-4D, when the multiplane engine 112 detects a user input event (e.g., a user tilting the computing device 100 to the right, left, forward, backward, etc.), the multiplane engine 112 could modify one or more aspects associated with the image layer(s), application content layer(s), and/or media layer(s). For example, when the user tilts the computing device 100 to the left, the multiplane engine 112 could detect a tilting event (e.g., via one or more I/O devices 104, such as a magnetometer). Then, in response to the tilting event, the multiplane engine 112 could shift the foreground tree image layer 418 to the left, such that only the roots of the image of the foreground tree are visible, as shown in FIGS. 4C and 4D.

Additionally, in response to detecting the tilting event, the multiplane engine 112 could move the log image layer 422 down and to the left, move the mid-ground tree image layer 420 to the left, and move the character image layer 434 to the right. Thus, the multiplane engine 112 could be simulating that the perspective of the user is changing, for example, to simulate that the user is leaning forward and to the right to look behind the tree image included in the mid-ground tree image layer 420. Notably, by modifying each layer separately (e.g., by shifting the image layers by different amounts), the multiplane engine 112 is able to emulate a three-dimensional scene having depth and/or perspective.

Similarly, if the user tilts the computing device 100 to the right, then the multiplane engine 112 could detect another tilting event. In response, the multiplane engine 112 could modify one or more aspects of the content page 410, such as by shifting one or more images included in the foreground tree image layer 418, mid-ground tree image layer 420, etc. to the right to simulate that the user is leaning to the left. Additionally, the assets included in one or more layers may be moved up or down in response to the user tilting the computing device 100 backwards or forwards.

As further shown in FIGS. 4A-4D, the light image layer 414 could be modified in response to an application event.

For example, as shown, in response to detecting the titling event, the multiplane engine 112 could increase the size of the light image layer 414 (e.g., by increasing the size of one or more images included in the layer). The multiplane engine 112 could further decrease the opacity of the scattered light image layer 418, as shown in FIGS. 4C and 4D, in order to simulate that the user is moving closer to the scattered light image layer 416.

In addition, the multiplane engine 112 could detect another type of application event when a media track ends. For example, in response to detecting that a media track (e.g., associated with a media layer) ended, the multiplane engine 112 could modify content page 410 by displaying one or more new text layers and/or image layers that include a title, artist, genre, etc. of the next media track. The multiplane engine 112 could further access the next media track from the database 114 or the application server 220 via the network 210 and displays additional layers, such as a new character image layer, a new background image layer, etc. associated with the next media track.

In some embodiments, as shown in FIG. 4B, the multiplane engine 112 could provide hints to the software application 111 in order to cause the software application 111 to modify the position of the application content layer 426, which displays the current track title, such that the title is placed just to the right of the center of the display. In addition, the multiplane engine 112 could provide hints to the software application 111 to cause the software application 111 to modify the position of the application content layer 428, which displays the upcoming track title. The multiplane engine 112 could further provide hints to the software application 111 to cause the software application 111 to move an application content layer 436 to the left side of the content page 410. Because the z order of the application content layer 436 is less than the z order of the foreground tree image layer 418, but greater than the z order of the mid-ground tree image layer 420, the previous media track title then appears to be in between two trees.

In some embodiments, the multiplane engine 112 could modify the position of one or more layers based on a user input event, such as a touchscreen swiping event, a mouse scrolling event, a shaking event, a voice command, a user gesture, etc. For example, in response to a user input event, the multiplane engine 112 could provide hints to the software application 111 to cause the software application 111 to modify the position of application content layer 426, 428, 436, which display the current track title, the upcoming track title, and the previous track title, respectively. Specifically, as shown in FIGS. 4B and 4C, the multiplane engine 112 could shift the current track title to the center of the content page 410 and shift the upcoming track title and the previous track title to the left. Thus, in response to an application event (e.g., a user input event), the track titles appears to rotate within the content page 410, with the previous track title eventually disappearing between the foreground tree layer 418 and the mid-ground tree layer 420.

FIGS. 5A-5F illustrate an animation of various assets and layers generated by the multiplane 112, in response to a user input event, according to various embodiments of the present invention. As described above, the multiplane engine 112 displays a content page 500 as layers stacked one on top of another. Each layer may be associated with one or more parameters that define various properties of the layers, such as size, position, opacity, etc.

Specifically, as shown, the content page 500 includes a character image layer 510, application content layers 520, 540, and 550, a background image layer 530, and a color layer 560. In addition, the content page 500 may include a media layer that specifies how and/or when an audio and/or video track is played.

The character image layer 510 may include a size parameter, a position parameter, an opacity parameter, a z order parameter, and/or a blur parameter. As described above, the size parameter specifies the height and/or width of the character image and the position parameter specifies that the character image should be displayed on the left side of the content page 500. Further, the z order parameter specifies that the character image layer 510 should be displayed near the front of the stack of layers, in front of the background image layer 530. Additionally, the character image layer 510 could include a blur that specifies that no blur should be applied to the character image, so that the character appears to be closer to the user.

Similarly, the application content layers 520, 540, and 550 may include a class parameter. In various embodiments, the multiplane engine 112 may read a template to determine the classes of devices on which the application content layers 520, 540, and 550 should be displayed. For example, as shown below in Table 1A, the template could include a size_class parameter that indicates that the application content layers 520, 540, and 550 should be displayed on computing devices belonging to a wide class and a regular class. In some embodiments, the z parameter specifies that the z order of the application content layers 520, 540, and 550. Specifically, as shown in Table 1A, the z parameter is set to 5, indicating that the multiplane engine 112 should display the application content layers 520, 540, 550 in front of the background image layer 530, which has a z parameter value of 2, but behind the character image layer 510, which has a z parameter value of 6. The x_alignment parameter may specify that the multiplane engine 112 should align the application content with the right side of the content page 500. Finally, the footer aspect parameter may specify the aspect ratio of the footer region of the content page 500.

The application content layers 520, 540, and 550 may further include an x parameter, a y parameter, a width parameter, and a height parameter, as shown in Table 1A. The x and y parameters indicate a position of the application content layers 520, 540, and 550 in the content page 500 and the width and height parameters indicate the size of the application content layers 520, 540, and 550.

TABLE 1A

Example template for application content layers 520 & 540

{
   "size_class" : [
     "wide",
     "regular"
   ],
   "x_alignment" : 0.71,
   "x" : 0.5,
   "y" : 0.5,
   "width" : 1,
   "footer_aspect" : 2.7,
   "z" : 5,
   "comment" : "Determines title alignment on larger devices",
   "type" : "multiplane_layer",
   "suppress_background" : true,
   "container" : "page",
   "height" : 1,
   "layer_type" : "content",
   "name" : "Content"
}, As shown below in Table 1 B, the multiplane engine 112 could display the application content layers 520, 540, and 550 in computing devices 100 belonging to the compact class. In addition, the x_alignment may specify that the alignment parameter should align the application content with the center of the content page 500.

TABLE 1B

Example template for application content layers 520 & 540

```
{
  "size_class" : [
    "compact"
  ],
  "x_alignment" : 0.5,
  "x" : 0.5,
  "y" : 0.5,
  "width" : 1,
  "footer_aspect" : 2.7,
  "z" : 5,
  "comment" : "Determines title alignment on small devices",
  "type" : "multiplane_layer",
  "suppress_background" : true,
  "container" : "page",
  "height" : 1,
  "layer_type" : "content",
  "name" : "Content (compact)"
},
```

The background image layer 530 may include size and position parameters that specify the height, width, and position of the background image layer 530 (e.g., that a width of the background image layer 530 is equal to the width of the content page 500). Further, a z order parameter could indicate that the background image layer 530 should be displayed near the back of the content page 500, and a blur parameter could indicate that the background image should be blurred, so that the background image appears far away.

The color layer 560 may include a class parameter. As shown in Table 2, the color layer 560 could be displayed in the wide, compact, and regular classes. The container parameter may indicate the region of the content page 500 in which the multiplane engine 112 should display the color layer 560. As shown, the color layer 560 could be displayed throughout the entire page. The x and y parameters may specify the position where the color layer 560 should be displayed. As shown, x and y parameters have a value of 0.5, such that the color layer 560 should be displayed at the center of the content page 500. Further, the width and height may specify the size of the color layer 560. As shown, the width and height parameters have a value of 1, such that the size of the color layer 560 equals the dimensions of the content page 500. In addition, the color parameter may specify the color of the color layer 560, and the z parameter may specify the z order parameter which specifies that the color layer should be displayed at the back of the content page 560. The color-alpha parameter may specify the opacity parameter which specifies that the color layer should be opaque.

TABLE 2

Example template for color layer 560

```
{
  "size_class" : [
    "wide",
    "compact",
    "regular"
  ],
  "x" : 0.5,
  "color_alpha" : 1,
```

TABLE 2-continued

Example template for color layer 560

```
  "y" : 0.5,
  "width" : 1,
  "type" : "multiplane_layer",
  "z" : 0,
  "comment" : "Overall background color",
  "color" : "{background_color}",
  "container" : "page",
  "height" : 1,
  "layer_type" : "color",
  "name" : "Background"
},
```

The media layer may be associated with parameters that include a media URL parameter, a volume parameter, a fade-in time parameter, and a fade-out time parameter. As described above, the media layer could be implemented in the wide, compact, and regular classes. The volume parameter may specify how loudly the audio track is played. As shown in Table 3, the volume parameter specifies that the volume should be at half of a maximum value. As described above, the multiplane engine 112 could display the media layer throughout the entire page, centered at the center of the content page 500 and with size equal to the dimensions of the content page 500. The z order parameter has a value of −1 as the media layer is not a visual layer, and thus cannot be physically seen by the user. The audio_url parameter may specify the media URL for the media file to be played. In some embodiments, the multiplane engine 112 may stream the media content from the location to which the media URL points. In some embodiments, the multiplane engine 112 and/or the software application 111 may download and store the media file in the database 114.

TABLE 3

Example template for the media layer

```
{
  "size_class" : [
    "wide",
    "compact",
    "regular"
  ],
  "volume" : 0.5,
  "x" : 0.5,
  "y" : 0.5,
  "width" : 1,
  "audio_url" : "{audio_audio_url}",
  "type" : "multiplane_layer",
  "z" : -1,
  "comment" : "Optional audio file to be played when page is loaded",
  "fade_out_time" : 5,
  "container" : "page",
  "height" : 1,
  "layer_type" : "audio",
  "name" : "Audio"
}
```

As noted above, a template may indicate how one or more parameters associated with one or more layers should be modified in response to one or more types of application events. In some embodiments, application events could include a user input event, a time event, an external event, etc., such as data received from another device or software application. Upon detecting an application event, the multiplane engine 112 may modify one or more aspects of one or more layers based on the parameter(s) stored in a template associated with the content page.

Figure 5B:
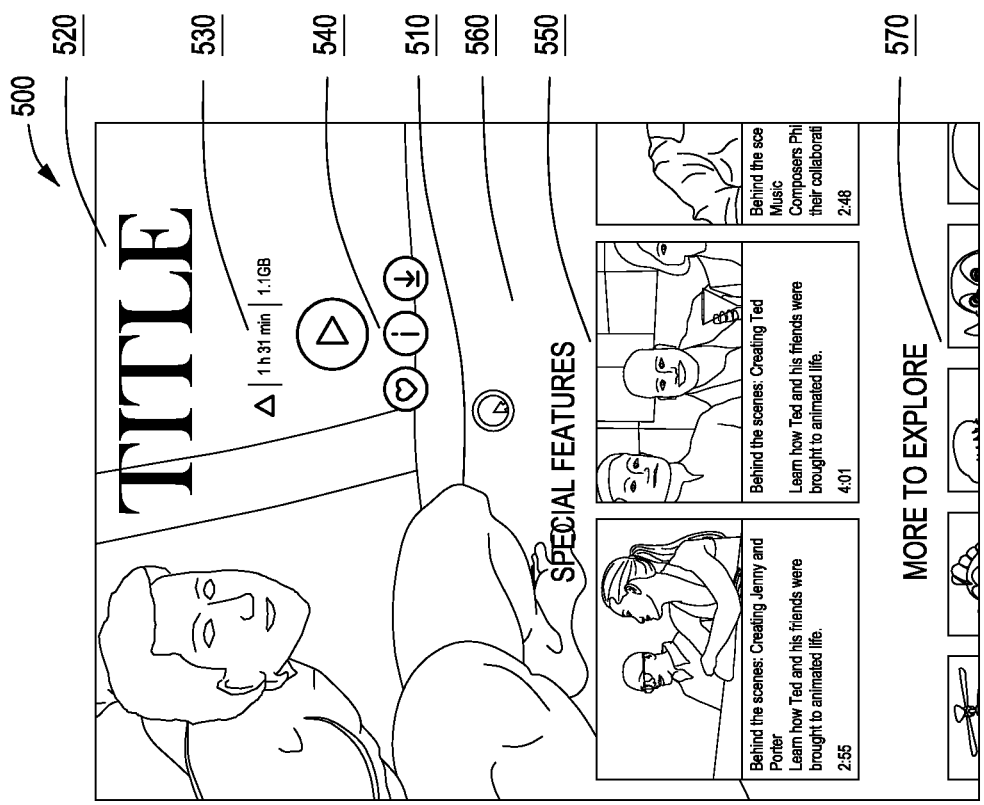
FIGS. 5A-5F illustrate an animation of various assets and layers generated by the multiplane engine in response to a user input event, according to various embodiments of the present invention.
Figure 5A:
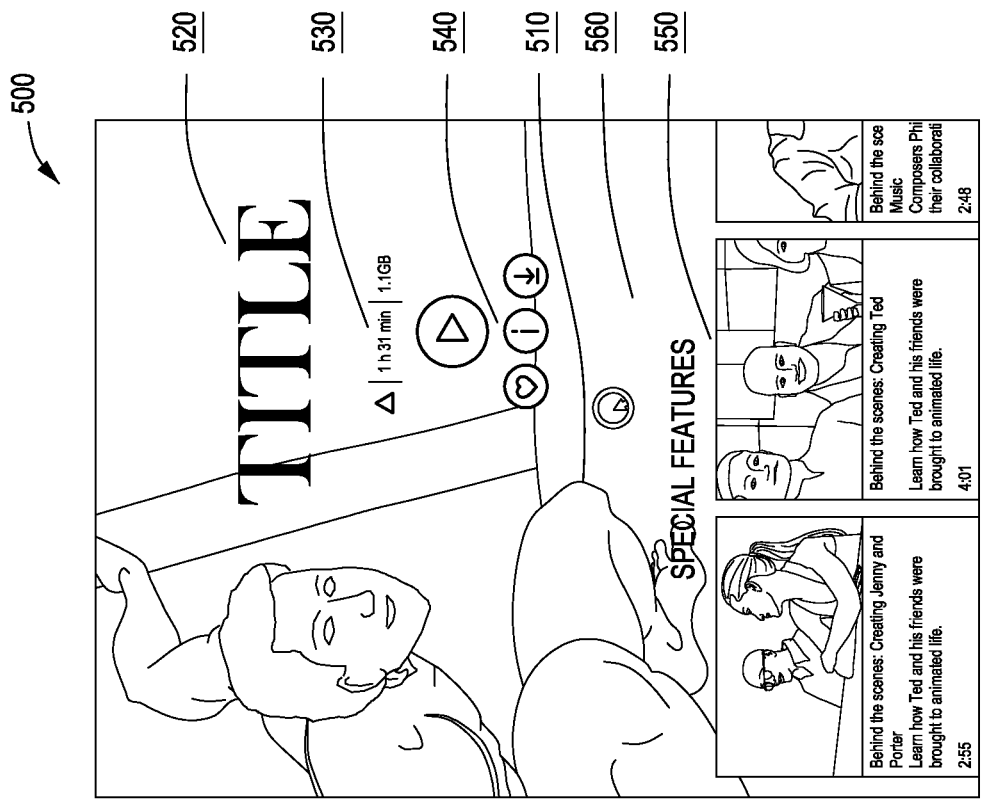
Figure 5D:
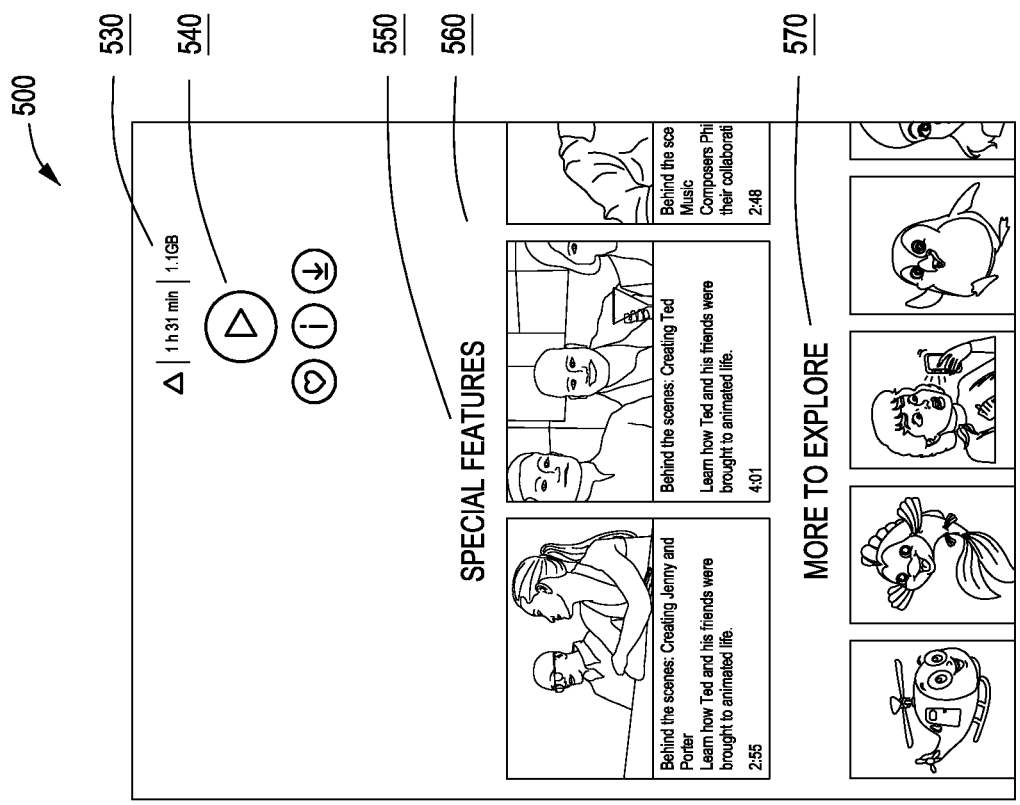
Figure 5C:
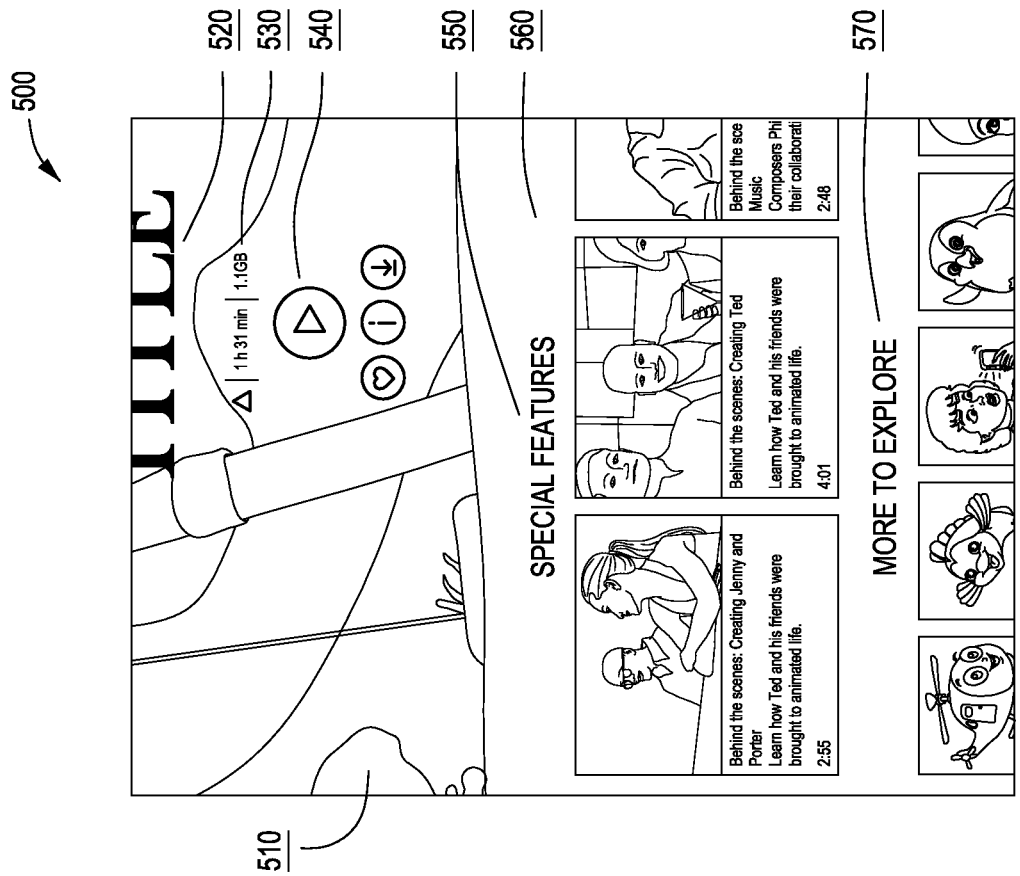

In some embodiments, as shown in FIGS. 5B-5D, when the multiplane engine 112 detects a user input event (e.g., a user scrolling up or down the content page 500), the multiplane engine 112 could modify one or more aspects associated with the image layer(s), application content layer(s), and/or media layer(s). For example, when the user scrolls down the content page 500, the multiplane engine 112 could detect a scrolling event (e.g., via one or more I/O devices 104, such as a touch screen interface, a mouse, a keyboard, microphone, image sensor, etc.). Then, in response to the scrolling event, the multiplane engine 112 could shift the character image layer 510 down and to the left as shown in FIGS. 5B-5D. In addition, the multiplane engine 112 could increase the blur and the scale of the character image layer 510, while the multiplane engine 112 moves the character image off of the content page 500. Thus, the multiplane engine 112 could simulate that the perspective of the user is changing, for example, to simulate that the character image is swinging towards the user.

In addition, in response to detecting a scrolling event related to the user scrolling downwards within the content page 500, the multiplane engine 112 could decrease the opacity of the background image layer 530, as shown in FIGS. 5B-5D. Simultaneously, the multiplane engine 112 could move the background image layer 530, upwards in the content page 500. Thus, the multiplane engine 112 could simulate that the user is climbing down a tree and into the forest depicted in the background image layer 530. Notably, by modifying each layer separately (e.g., by shifting, scaling, blurring, etc. the image layers by different amounts), the multiplane engine 112 is able to emulate a three-dimensional scene having depth and/or perspective.

Figure 5F:
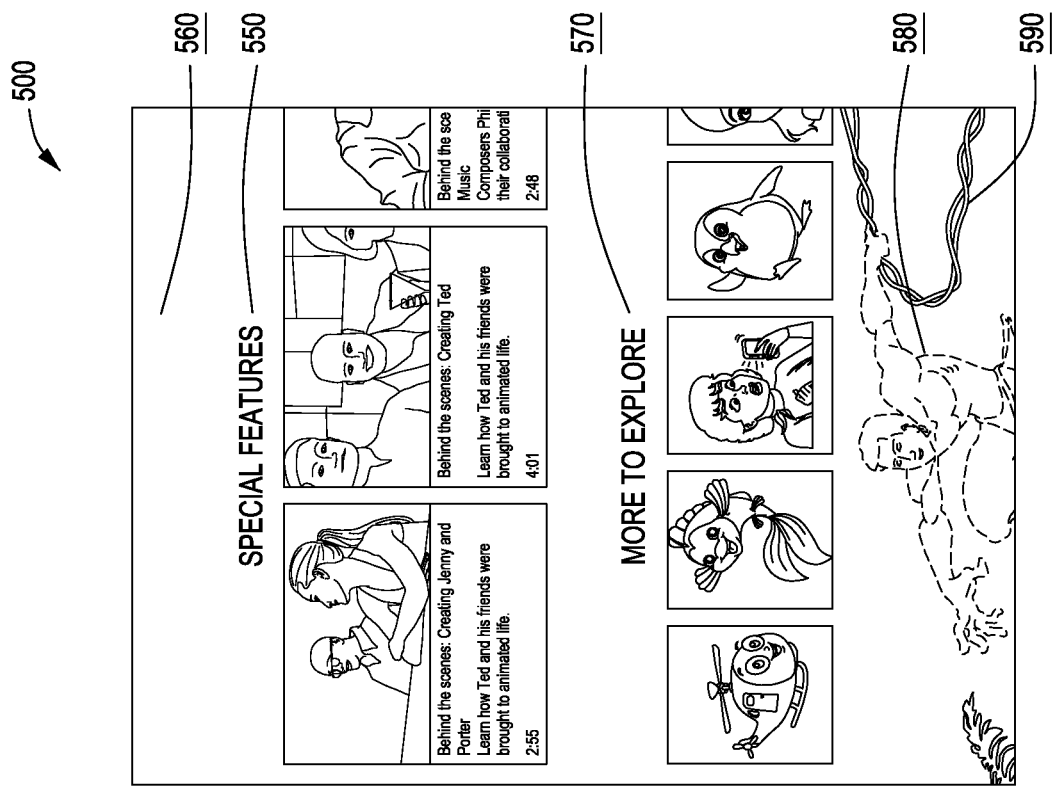
Figure 5E:
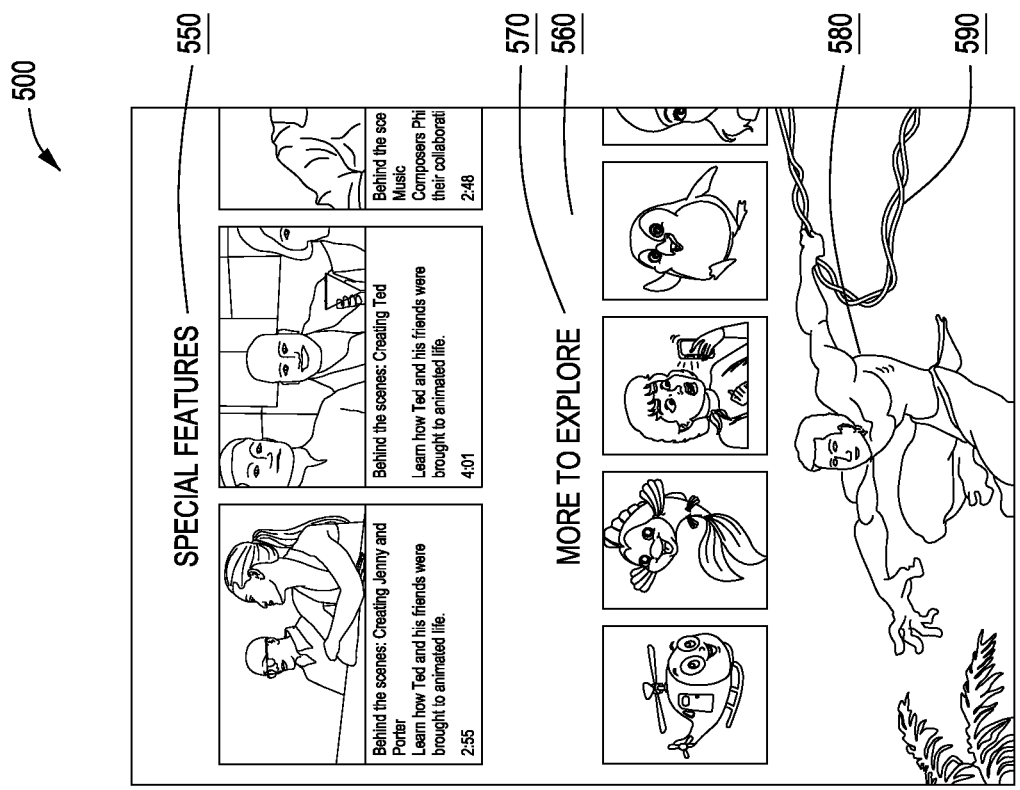

Furthermore, in some embodiments, in response to the scrolling event, the multiplane engine 112 could display a second character image 580 and a second background image layer 590, as shown in FIGS. 5E-5F. Specifically, as shown, the multiplane engine 112 could shift the character image layer 580 down and to the right. In addition, the multiplane engine 112 could increase the blur and the scale of the character image layer 580 while the character image layer 580 moves off of the content page 500. Thus, the multiplane engine 112 could simulate that the character image is swinging on a rope affixed to a tree in the background image layer 590.

In addition, in response to detecting that the user is scrolling upwards, the multiplane engine 112 could increase the blur of the background image layer 590, while moving the background layer 590 and the character image layer 580 downwards in the content page 500, as shown in FIGS. 5B-5D. Thus, the multiplane engine 112 could simulate that the user is climbing back up the tree included in the forest depicted by the background image layer 530.

As shown below in Table 4, a layer may include one or more parameters that specify how the layer will be animated in response to an application event. In some embodiments, an animation may be associated with position parameters (e.g., x and y parameters), a blur parameter, a scale parameter, and/or any other type of parameter that can be modified in response to an application event. Further, in some embodiments, the parameters associated with a particular animation may include an animation_type parameter that specifies the type(s) of application event(s) that cause an animation to occur. In the example shown in Table 4, the value of the animation_type parameter could be set to 0, indicating that the animation occurs in response to a default application event (e.g., a scrolling event). Additionally, in some embodiments, a value of 1 could indicate that the animation occurs in response to a tilting event, a value of 2 could indicate that the animation occurs in response to a time event, a value of 3 could indicate that the animation occurs in response to a pinch-to-zoom event, or a value of 4 could indicate that the animation occurs in response to a swipe event. Any other type of application event may be specified by the animation_type parameter.

In various embodiments, the value associated with each parameter specifies an amount that a particular parameter should be modified per application event detected by the multiplane engine 112. For example, as shown below in Table 4, for each application event (e.g., a scrolling event performed in a specific direction, such as scrolling down a page) detected by the multiplane engine 112, the x position of the character image could be moved by −2 units, the y position of the character image could be moved by −3 units, the amount of blur applied of the character image could be increased by 50 units, and the scale of the character image could be modified by 0.5 units. In addition, when the reverse of a particular application event is detected (e.g., a user scrolling up a page), the sign of one or more parameters may be switched so that the animation is performed in reverse. For example, with respect to the example described above, the x position of the character image could be moved by 2 units, the y position of the character image could be moved by 3 units, the amount of blur applied of the character image could be decreased by 50 units, and the scale of the character image could be modified by −0.5 units.

TABLE 4

Example template for character image layer 510 animation

```
{
    "size_class" : [
        "wide",
        "regular"
    ],
    "x_anchor" : 0,
    "x" : 0,
    "color_alpha" : 0,
    "y" : 0,
    "width" : 0.65,
    "image_url" : "{header_foreground_image_url}",
    "type" : "multiplane_layer",
    "z" : 4,
    "comment" : "Character image when scrolled to top of page",
    "animations" : [
        {
            "x" : -2,
            "animation_type" : 0,
            "y" : -3,
            "blur" : 50,
            "type" : "multiplane_animation",
            "comment" : "Scrolling adjusts layer position, scale, opacity, and blur",
            "name" : "Animation",
            "scale" : 0.5
        }
    ],
    "aspect_ratio" : "{header_foreground_aspect_ratio}",
    "container" : "header",
    "height" : 0,
    "y_anchor" : 0,
    "layer_type" : "image",
    "name" : "Header Foreground"
},
```

In general, application events can be defined at any granularity. For example, a scrolling event could be defined as scrolling a particular number of lines, scrolling through a particular portion of a page, scrolling through an entire page, etc. As another example, a tilting event could be defined as the computing device 100 being titled a certain number of degrees, relative to a particular axis or plane. Additionally, a time event could be defined as a particular number of seconds, minutes, or hours, a particular number of processor clock cycles, etc.

Figure 6:
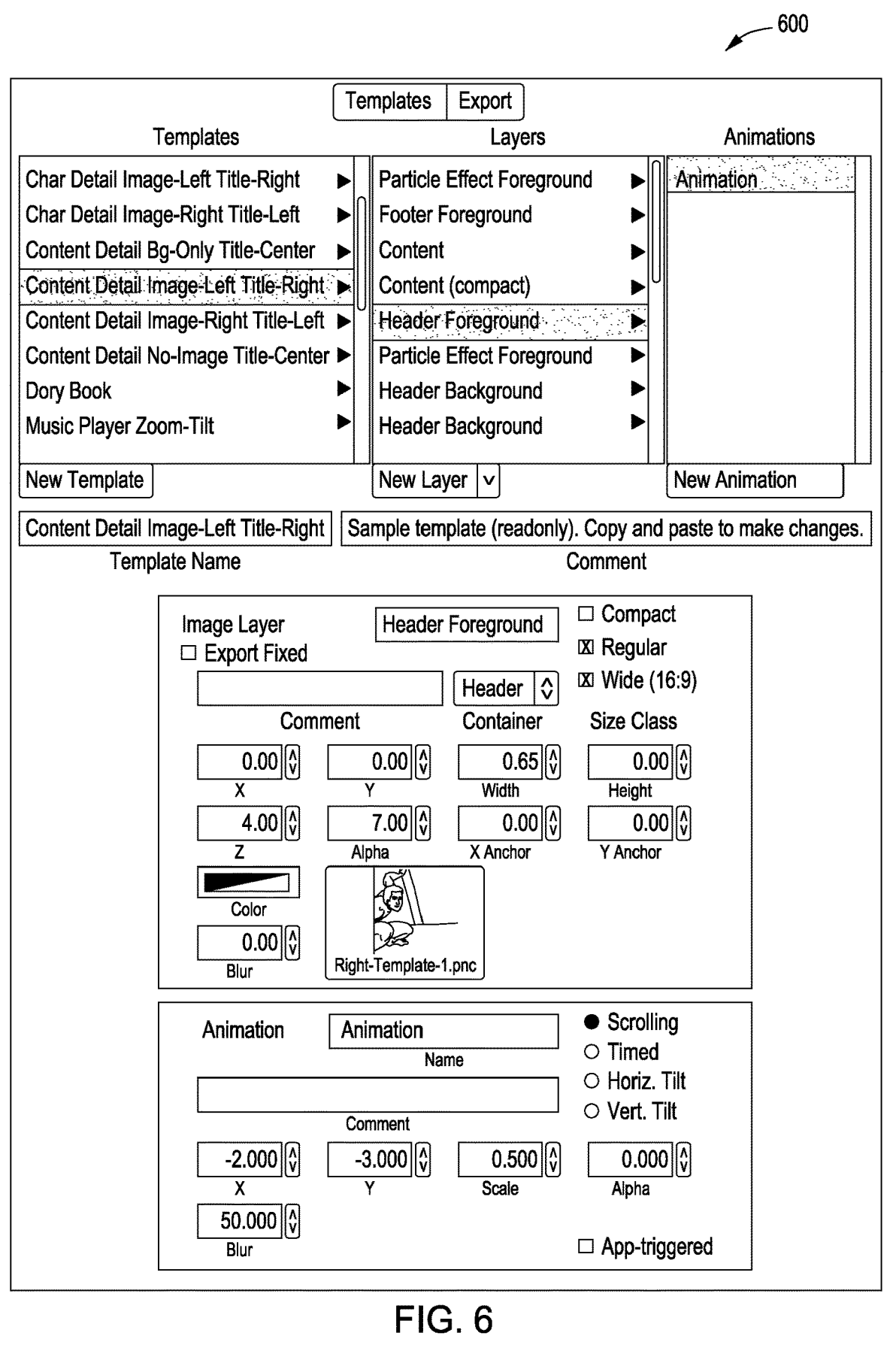

FIG. 6 illustrates an interface for configuring a template by selecting how application events affect parameters associated with assets and layers included in the template, according to various embodiments of the present invention. As shown, the interface includes a listing of templates, layers, and animations.

Depending on the content that an application developer would like to display, the application developer can select between various templates. For example, an application developer can select from a character detail template, a content detail template, a music player template, and/or other types of templates. Further, for the character detail templates and content detail templates, the application developer can select between different content page arrangements, including title-left and image-right and title-right and image-left. For a content page template, the application developer could further select to have the title centered with no image.

After selecting a desired template, the application developer could then select from different types of layers. The application developer could then specify the region in which the layer will be displayed (e.g., a header region, a footer region, across the entire content page, etc.), the size class(es) for which the layer will be displayed (e.g., compact, wide, and/or regular), the z order parameter, and/or other type of details about the layer. As shown, the application developer could further select an x parameter, a y parameter, a width parameter, a height parameter, an opacity parameter, a blur parameter, and/or a x anchor and a y anchor, which may specify the coordinate reference points for the layer within the region.

The application developer could further associate an animation with one or more parameters associated with the layer. For example, the application developer could select an application event for which to perform the animation. The application developer could then select an amount by which each parameter will be modified in response to the application event.

Figure 7A:
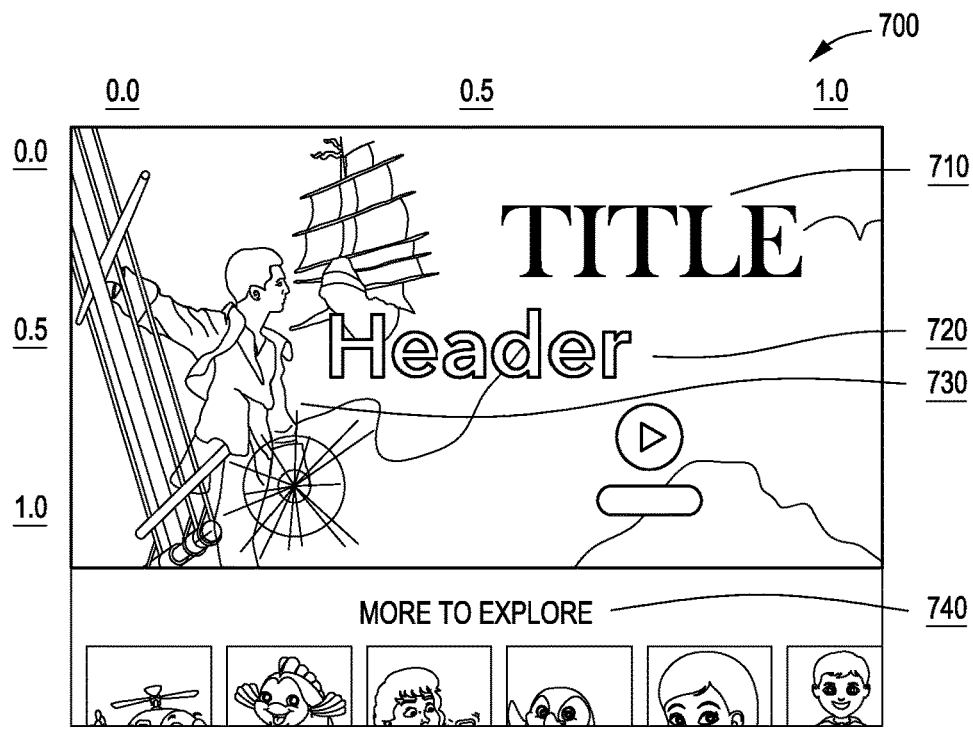
FIGS. 7A-7B illustrate different regions in which layers can be displayed in a content page, according to various embodiments of the present invention.
Figure 7B:
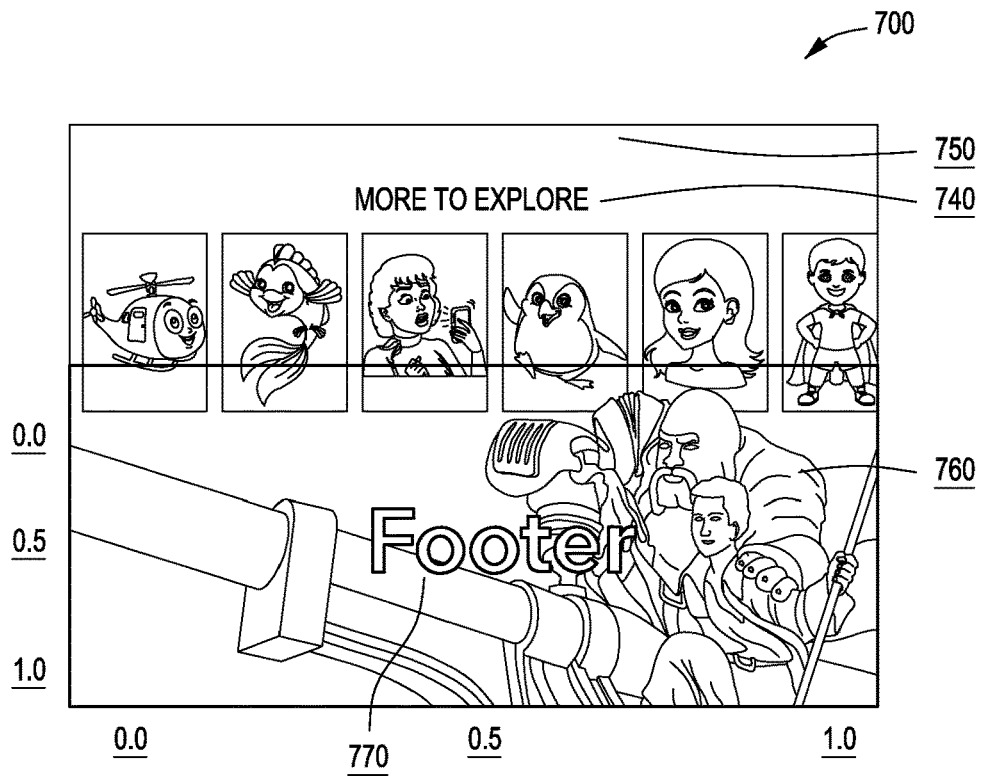

FIGS. 7A and 7B illustrate different regions in which layers can be displayed in a content page, according to various embodiments of the present invention. As shown, content page 700 includes is the header region 720 disposed at the top of the content page 700 and a footer region 770 disposed at the bottom of the content page 700.

In various embodiments, layers that are assigned to the header region 720 or footer region 770 may be positioned within the region according to a unit coordinate system. Using the unit coordinate system, any point in the header region 720 or footer region 770 can be specified via an x value and a y value between 0.0 and 1.0. For example, in order to position a particular layer at the center of the header region 720, an x value of 0.5 may be assigned to the layer, and a y value of 0.5 may be assigned to the layer.

FIGS. 8A-8D illustrate content pages that may be implemented by different device classes based on a class parameter specified in a template, according to various embodiments of the present invention. FIG. 8A illustrates a wide class, which could include TV style displays, such as Apple® tvOS®. FIG. 8B illustrates a compact class, which could include phone size displays, such as an Apple® iPhone®. Finally, FIGS. 8C and 8D illustrate a regular class, which could include laptop and computer screen size displays as well as tablet displays.

FIGS. 8A-8D include a content page 800, a color layer 810, an character image layer 820, and application content layers 830 and 840. As noted above, the multiplane engine 112 can determine whether certain layers should displayed and how certain layers should be displayed on a particular device based on a class parameter included in the corresponding template. For example, a character image layer 820 could be displayed at the right side of the content page 800 in the wide class of devices, as shown in FIG. 8A, and at the right side of the content page 800 in the regular class of devices, as shown in FIGS. 8C-8D. By contrast, the character image layer 820 could be displayed at the center of the content page 800 for the compact class of devices, as shown in FIG. 8B, since such devices have less horizontal space in which content can be displayed. Accordingly, implementing a different content page 800 layout for compact devices may improve the overall appearance of the content page 800.

Figure 9:
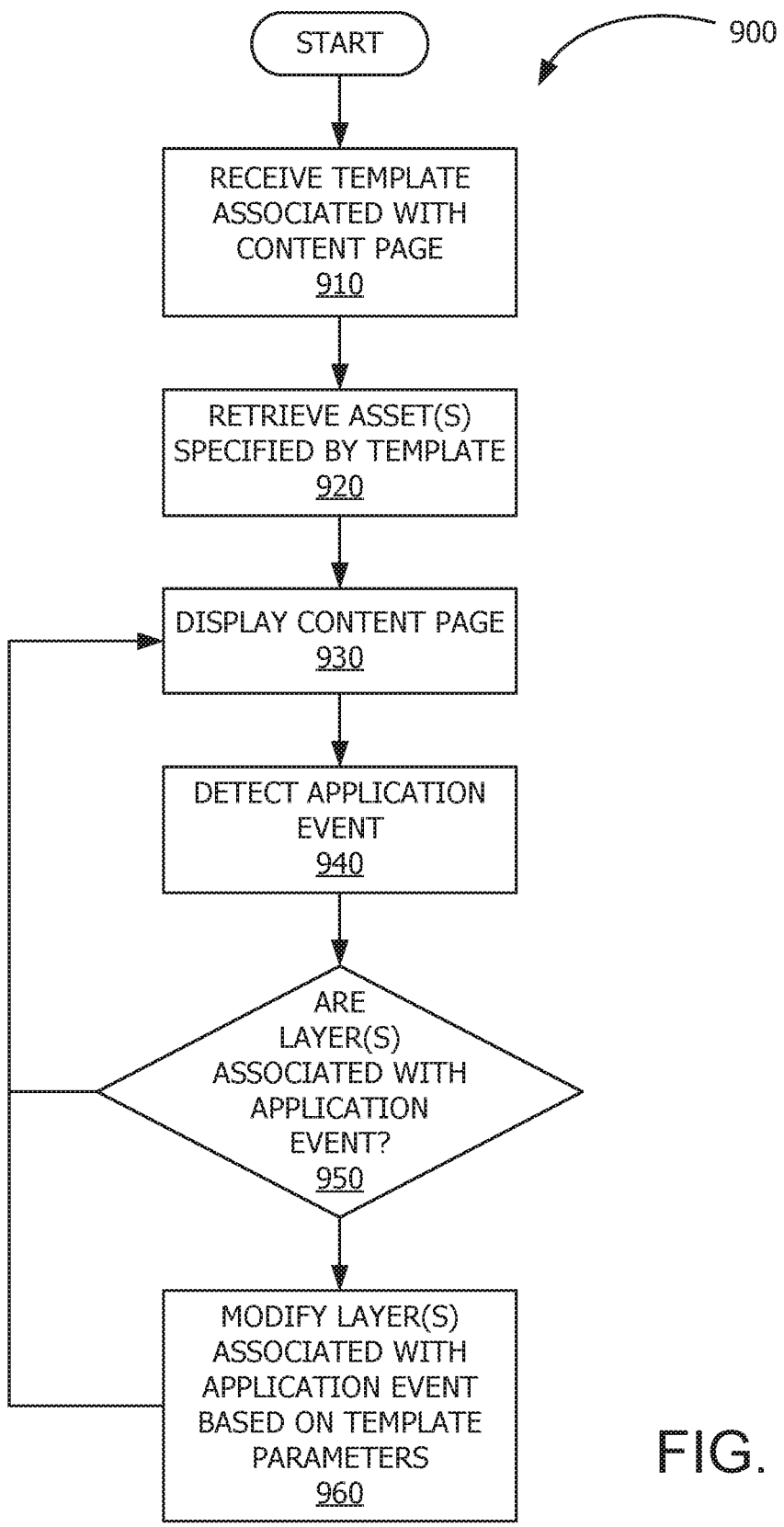
FIG. 9 illustrates a flow diagram of method steps for generating a multiplane animation, according to various embodiments of the present invention.

FIG. 9 illustrates a flow diagram of method steps for generating a multiplane animation, according to various embodiments of the present invention. Although the method steps are described in conjunction with the system of FIGS. 1 and 2, persons skilled in the art will understand that any system configured to perform the method steps, in any order, falls within the scope of the present invention.

As shown in FIG. 9, a method 900 begins at step 910, where the multiplane engine 112 receives a template associated with a content page to be displayed by the software application 111. Then, at step 920, the multiplane engine 112 receives one or more assets specified by the template. Next, at step 930, the multiplane engine 112 displays the content page. In some embodiments, the multiplane engine 112 may display two or more templates on a single content page. In addition, the multiplane engine 112 may transition between two or more templates using a variety of techniques, such as cut, cross-fade, zoom, etc. Also, the template may include additional regions, such as a left and/or a right region. The user may also define additional regions in a template and/or content page.

For example, at step 910, in response to a request to display a content page received by the software application 111, the multiplane engine 112 could request (e.g., from application server 220) a template associated with the content page. At step 920, the multiplane engine 112 could then read one or more URLs included in the template and download (e.g., via application server 220) assets located at the URLs. In addition, the multiplane engine 112 could determine that one or more of the assets specified by the template have already been downloaded and stored in the database 114. In such embodiments, at step 920, the multiplane engine 112 could then retrieve the asset(s) from the local database 114 (e.g., instead of via the application server 220 or another remote server) reducing bandwidth requirements and/or the latency of displaying the asset(s) and/or content page as a whole.

Further, because the template may be stored separately from the assets (e.g., images, audio, video, etc.), the template can be quickly downloaded by a user at runtime, enabling the user to receive more frequent updates to the template, without requiring the user to re-download the corresponding assets. For example, a user may download a particular set of assets associated with a content page once, after which the assets may be stored locally in the database 114. Then, when the application developer updates one or more aspects of the template, the multiplane engine 112 could retrieve the updated template at runtime and then quickly access the corresponding assets from the database 114. Accordingly, application developers are able to more frequently and more efficiently update a particular content page, without requiring the user to re-download the assets, such as a large video file, associated with that content page.

Next, at step 940, the multiplane engine 112 detects that an application event has occurred. As noted above, an application event could include any change of state associated with the software application 111 and/or computing device 100, such as a user input event, a time-based event, an external software or hardware event, etc. In addition, an application event could include touch events, where the user touches the display screen of the computing device 100 above one or more layers of the content page. An application event could also be triggered by the multiplane engine 112 displaying one or more layers on the content page. Also, an application event could include a first scrolling event that occurs after a page is loaded. After an application event occurs, the multiplane engine 112 could send data to the software application 111, such as a command, a string, etc. For instance, the multiplane engine could send a "play" string to the software application 111 if a user touches the display screen of the computing device 100 over a content page, At step 950, the multiplane engine 112 accesses a template associated with the content page and/or accesses data associated with the template, such as data stored in the database 114, and determines whether one or more layers included in the template are associated with the application event. For example, as described above, the template associated with a particular content page may specify how one or more aspects of one or more layers are to be modified in response to an application event.

If, at step 950, the multiplane engine 112 determines that the one or more layers are associated with the application event, then the method 900 proceeds to step 960, where the multiplane engine 112 modifies the layer(s) associated with the application event. The method 900 then returns to step 930. If, on the other hand, at step 950, the multiplane engine 112 determines that the application event is not associated with any layers included in the template, then the method 900 returns to step 930.

The multiplane engine can also animate a variety of layer types after detecting that an application event has occurred. For instance, one type of image layer is the image frame set layer. The image frame set layer includes a set of images specified by the template, which share a common animation scheme. The multiplane engine 112 could animate the images in the image frame set layer with a particular period (e.g., an animation loop) after detecting an application event.

In some embodiments, the multiplane engine 112 periodically samples the state of the computing device 100 to determine whether one or more application events have occurred within a specified period of time. For example, the multiplane engine 112 could sample the state of one or more components of the computing device 100 (e.g., an I/O device 104) once every 15 frames to determine whether an application event has occurred, such as a scrolling event, a time event, etc. If an application event has occurred, then the method 900 continues at step 950, where the multiplane engine 112 determines whether one or more layers in the template file are associated with the application event. In other embodiments, any other period of time (e.g., 30 frames, 60 frames, 1 second, 5 seconds, etc.) can be implemented by the multiplane engine 112. Sampling only once per specified period of time may reduce the likelihood that the multiplane engine 112 will interfere with the operation of the software application 111, such as user scrolling, timed animations of layers, etc. As a result, smooth visual effects can be generated by the software application 111 and the multiplane engine 112.

In sum, a multiplane engine receives a request to display a content page. The multiplane engine then retrieves a template that corresponds to the content page and, based on one or more URLs included in the template, retrieves one or more assets included in the content page. Next, the multiplane engine detects an application event and, in response, modifies an aspect of a layer included in the content page based on a parameter included in the template. The multiplane engine then outputs the modified layer for display, and detects one or more additional application events.

At least one advantage of the disclosed techniques is that memory, bandwidth, and processing requirements are significantly reduced. In addition, templates that specify how various types of layers are positioned and/or animated can be stored separately from the corresponding assets, enabling updated templates to be quickly downloaded at runtime. Furthermore, specific effects and/or layers can be modified or disabled on certain types of devices (e.g., devices having lower memory capacity, lower processing power, and/or smaller screen sizes), without significantly detracting from the overall user experience.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable storage media including instructions that, when executed by one or more processors, cause the one or more processors to perform steps of:
    downloading a plurality of assets for a content page and a first template file that includes instructions indicating how to modify one or more parameters of a first layer included in a plurality of layers of the content page based on a first event type;
    in response to receiving a request to display the content page, downloading a second template file that replaces the first template file without re-downloading the plurality of assets for the content page prior to displaying the content page;
    detecting a first application event corresponding to the first event type that the second template file associates with the first layer;
    modifying a first asset included in the plurality of assets and associated with the first layer based on the first application event, the first event type, and the second template file to generate a first modified layer; and
    displaying the content page including the first modified layer.

2. The one or more non-transitory computer-readable storage media of claim 1, wherein the first application event comprises a user input event.

3. The one or more non-transitory computer-readable storage media of claim 1, wherein the first application event comprises a tilting event in which a user device is tilted in a particular direction, and the second template file indicates that one or more assets of the first layer are to be shifted by a first amount in response to the tilting event, and that one or more assets of a second layer are to be shifted by a different amount in response to the tilting event.

4. The one or more non-transitory computer-readable storage media of claim 1, wherein modifying the first asset comprises at least one of modifying a position of the first asset, modifying a scale of the first asset, modifying a blur applied to the first asset, or modifying an opacity of the first asset.

5. The one or more non-transitory computer-readable storage media of claim 1, wherein the second template file comprises a JavaScript Object Notation (JSON) file.

6. The one or more non-transitory computer-readable storage media of claim 1, wherein the second template file comprises, for each layer included in the plurality of layers, one or more assets included in the layer, including the first asset, and the one or more parameters that specify how the one or more assets are to be displayed in the content page.

7. The one or more non-transitory computer-readable storage media of claim 1, wherein the second template file includes a z order parameter associated with the first layer, and displaying the content page including the first modified layer comprises:
    displaying the first modified layer in front of at least one layer included in the plurality of layers based on the z order parameter; and
    displaying the first modified layer behind at least one layer included in the plurality of layers based on the z order parameter.

8. The one or more non-transitory computer-readable storage media of claim 1, wherein the steps further comprise:
    determining a size class of a device on which the content page is to be displayed;
    determining, via a first class parameter included in the second template file, that the first layer is to be displayed on the device; and
    determining, via a second class parameter included in the second template file, that a third layer included in the plurality of layers is not to be displayed on the device.

9. The one or more non-transitory computer-readable storage media of claim 1, wherein the steps further comprise:
    receiving a request to display the content page; and, in response:
        requesting the second template file that corresponds to the content page,
        requesting one or more assets specified by one or more uniform resource locators (URLs) included in the second template file, and
        displaying the one or more assets within the plurality of layers according to the one or more parameters included in the second template file.

10. A method comprising:
    downloading a plurality of assets for a content page and a first template file that includes instructions indicating how to modify one or more parameters of a first layer included in a plurality of layers of the content page based on a first event type;

in response to receiving a request to display the content page, downloading a second template file that replaces the first template file without re-downloading the plurality of assets for the content page prior to displaying the content page;

detecting a first application event corresponding to the first event type that the second template file associates with the first layer;

modifying a first asset included in the plurality of assets and associated with the first layer based on the first application event, the first event type, and the second template file to generate a first modified layer; and displaying the content page including the first modified layer.

11. The method of claim 10, wherein the first application event comprises a user input event.

12. The method of claim 10, wherein the first application event comprises a tilting event in which a user device is tilted in a particular direction, and the second template file indicates that one or more assets of the first layer are to be shifted by a first amount in response to the tilting event, and that one or more assets of a second layer are to be shifted by a different amount in response to the tilting event.

13. The method of claim 10, wherein modifying the first asset comprises at least one of modifying a position of the first asset, modifying a scale of the first asset, modifying a blur applied to the first asset, or modifying an opacity of the first asset.

14. The method of claim 10, wherein the second template file comprises a JavaScript Object Notation (JSON) file.

15. The method of claim 10, wherein the second template file comprises, for each layer included in the plurality of layers, one or more assets included in the layer, including the first asset, and the one or more parameters that specify how the one or more assets are to be displayed in the content page.

16. The method of claim 10, wherein the second template file includes a z order parameter associated with the first layer, and displaying the content page including the first modified layer comprises:

displaying the first modified layer in front of at least one layer included in the plurality of layers based on the z order parameter; and displaying the first modified layer behind at least one layer included in the plurality of layers based on the z order parameter.

17. The method of claim 10, further comprising:
determining a size class of a device on which the content page is to be displayed;
determining, via a first class parameter included in the second template file, that the first layer is to be displayed on the device; and
determining, via a second class parameter included in the second template file, that a third layer included in the plurality of layers is not to be displayed on the device.

18. The method of claim 10, further comprising:
receiving a request to display the content page; and, in response:

requesting the second template file that corresponds to the content page,
requesting one or more assets specified by one or more uniform resource locators (URLs) included in the second template file, and
displaying the one or more assets within the plurality of layers according to the one or more parameters included in the second template file.

19. A computing device, comprising:
a memory storing a multiplane engine; and
a processor that is coupled to the memory and, when executing the multiplane engine, is configured to:
download a plurality of assets for a content page and a first template file that includes instructions indicating how to modify one or more parameters of a first layer included in a plurality of layers of the content page based on a first event type;
in response to receiving a request to display the content page, download a second template file that replaces the first template file without re-downloading the plurality of assets for the content page prior to displaying the content page,
detect a first application event corresponding to the first event type that the second template file associates with the first layer,
modify a first asset included in the plurality of assets and associated with the first layer based on the first application event, the first event type, and the second template file to generate a first modified layer, and
display the content page including the first modified layer.

20. The computing device of claim 19, wherein the first application event comprises a time event.

21. The one or more non-transitory computer-readable storage media of claim 1, wherein the second template file indicates that the first layer is associated with a first size class of devices having a display of a first size, and the second template file indicates that a second layer that corresponds to the first layer is associated with a second size class of devices having a display of a second size, and further comprising:
determining that a first device associated with a first display is assigned to the first size class of devices or the second size class of devices; and
determining, based on the second template file, how to display the first layer on the first display when the first device is assigned to the first size class of devices; or
determining, based on the second template file, how to display the second layer on the first display when the first device is assigned to the first size class of devices.

22. The one or more non-transitory computer-readable storage media of claim 1, wherein the first asset of the first layer is stored locally on a user device, and wherein downloading the second template file comprises downloading the second template file from an application server to the user device.

* * * * *